United States Patent
Nagano et al.

(10) Patent No.: US 10,829,587 B2
(45) Date of Patent: Nov. 10, 2020

(54) EPOXY RESIN COMPOSITION, EPOXY RESIN CURED PRODUCT, PREPREG AND FIBER-REINFORCED COMPOSITE MATERIAL

(71) Applicant: Toray Industries, Inc., Tokyo (JP)

(72) Inventors: Maki Nagano, Nagoya (JP); Ayako Fuse, Nagoya (JP); Nobuyuki Tomioka, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 15/762,643

(22) PCT Filed: Jul. 21, 2016

(86) PCT No.: PCT/JP2016/071374
§ 371 (c)(1),
(2) Date: Mar. 23, 2018

(87) PCT Pub. No.: WO2017/056653
PCT Pub. Date: Apr. 6, 2017

(65) Prior Publication Data
US 2018/0265625 A1    Sep. 20, 2018

(30) Foreign Application Priority Data

Sep. 29, 2015 (JP) .................. 2015-190913

(51) Int. Cl.
| | |
|---|---|
| *C08G 59/24* | (2006.01) |
| *C08J 5/24* | (2006.01) |
| *C08L 63/00* | (2006.01) |
| *C08K 5/41* | (2006.01) |
| *C08G 59/20* | (2006.01) |
| *C08L 101/00* | (2006.01) |
| *C08K 5/315* | (2006.01) |
| *C08G 59/50* | (2006.01) |
| *C08G 59/28* | (2006.01) |
| *C08G 59/30* | (2006.01) |

(52) U.S. Cl.
CPC .......... *C08G 59/245* (2013.01); *C08G 59/20* (2013.01); *C08G 59/28* (2013.01); *C08G 59/50* (2013.01); *C08G 59/504* (2013.01); *C08G 59/5006* (2013.01); *C08J 5/24* (2013.01); *C08K 5/315* (2013.01); *C08K 5/41* (2013.01); *C08L 63/00* (2013.01); *C08L 101/00* (2013.01); *C08G 59/302* (2013.01); *C08J 2363/00* (2013.01); *C08J 2463/00* (2013.01); *C08L 2205/025* (2013.01); *C08L 2205/03* (2013.01)

(58) Field of Classification Search
CPC .................................................. C08G 59/245
See application file for complete search history.

(56) References Cited

U.S. PATENT DOCUMENTS

| | | | | |
|---|---|---|---|---|
| 4,900,848 | A * | 2/1990 | Saito | C08G 59/3227 428/413 |
| 6,090,870 | A | 7/2000 | Chang et al. | |
| 2004/0258899 | A1* | 12/2004 | Takeuchi | C08J 5/24 428/292.1 |
| 2015/0210813 | A1* | 7/2015 | Arai | C08J 5/06 428/298.7 |

FOREIGN PATENT DOCUMENTS

| | | |
|---|---|---|
| JP | 58-140089 A | 8/1983 |
| JP | 62-074918 A | 4/1987 |
| JP | 03-021631 A | 1/1991 |
| JP | 09-132635 A | 5/1997 |
| JP | 10-511426 A | 11/1998 |
| JP | 2004-315572 A | 11/2004 |
| JP | 2008-255367 A | 10/2008 |
| JP | 2011-162619 A | 8/2011 |
| JP | 2015-527462 A | 9/2015 |
| WO | WO 97/24398 * | 7/1997 |
| WO | 2012/102201 A1 | 8/2012 |

* cited by examiner

Primary Examiner — Megan McCulley
(74) Attorney, Agent, or Firm — DLA Piper LLP (US)

(57) ABSTRACT

An epoxy resin composition produces a cured product having improved elastic modulus and improved nominal strain at compressive fracture. The epoxy resin composition is a fiber-reinforced composite material having excellent compression strength and interlayer toughness. The epoxy resin composition contains at least the following constituent components [A], [B] and [C]. [A] A specific ortho type epoxy resin. [B] At least one component selected from the group consisting of: thermoplastic resins that are compatible with the epoxy resin [A]; and core-shell type polymers. [C] An amine curing agent.

13 Claims, No Drawings

EPOXY RESIN COMPOSITION, EPOXY RESIN CURED PRODUCT, PREPREG AND FIBER-REINFORCED COMPOSITE MATERIAL

TECHNICAL FIELD

This disclosure relates to fiber reinforced composite material suitable for aerospace applications, sporting goods, and general industrial uses; cured epoxy resin products and prepreg for the production thereof; and epoxy resin compositions preferred as matrix resin thereof.

BACKGROUND

High in specific strength and specific modulus, fiber reinforced composite materials containing reinforcement fiber such as carbon fiber and aramid fiber have recently been used widely to manufacture structural materials for aircraft and automobiles, sporting goods such as tennis rackets, golf shafts, and fishing poles, as well as general industrial applications. Fiber reinforced composite materials are manufactured by, for example, stacking a plurality of layers of prepreg, that is, sheet-like intermediate material prepared by impregnating reinforcement fiber with uncured matrix resin, followed by curing them by heating, or by injecting liquid resin into reinforcement fiber placed in a mold, followed by curing the resin by heating. This is called the resin transfer molding method.

Of those production methods, the use of prepregs has the advantage of enabling easy production of high performance fiber reinforced composite material because the orientation of the reinforcement fiber can be controlled accurately and also because a high degree of design freedom is ensured for the stack structure. As the matrix resin of such prepregs, thermosetting resins are mainly used from the viewpoint of heat resistance and productivity and in particular, epoxy resin is preferred from the viewpoint of mechanical characteristics such as adhesion between resin and reinforcement fiber, their dimensional stability, and the strength and rigidity of composite materials produced from them. However, although higher in elastic modulus than thermoplastic resins, epoxy resin is inferior in toughness and unable to produce fiber reinforced composite materials with required impact resistance.

To solve the toughness problem of epoxy resin, some methods have been attempted including the addition of a rubber component or thermoplastic resin that have high toughness. However, such methods tend to have disadvantages such as a decline in elastic modulus, heat resistance and the like, deterioration in processability due to increased viscosity, and deterioration in quality due to generation of voids.

To solve those problems, there is a proposal of newly developed epoxy resin blends having improved molecular structures realized by structural isomerization of general purpose epoxy resin. Published Japanese Translation of PCT International Publication JP HEI 10-511426, for example, discloses that a cured resin with an improved elastic modulus can be obtained by using triglycidyl m-aminophenol instead of triglycidyl para-aminophenol, thus serving to provide a fiber reinforced composite material with a high compression strength. Other proposals such as the use of a resin composition containing tetraglycidyl-2'-methyl-2,4'-diaminodiphenyl methane have also been disclosed.

Japanese Unexamined Patent Publication No. 2008-255367 discloses that high heat resistance and low water absorbency are realized when an epoxy resin containing 2,4'-diglycidyloxydiphenyl sulfone is cured with an acid anhydride.

Furthermore, U.S. Pat. No. 6,090,870, which assumes application to semiconductor sealing agents, suggests that the addition of 2,2'-bis(glycidyloxy) biphenyl up to 5 mass % to an epoxy resin composition containing a large quantity of silica particles serves to produce a cured resin having a reduced water absorbency, an improved heat resistance, and a decreased coefficient of linear expansion.

Implementation of the method proposed in JP '426, however, tends to result in a cured epoxy resin having a decreased nominal compressive strain at break and fails to achieve a large improvement in toughness.

The method proposed in JP '367 has the problem of being able only to produce a cured epoxy resin low in both elastic modulus and nominal compressive strain at break.

The method proposed in US '870 has the problem of being able only to produce a cured epoxy resin low in nominal compressive strain at break. No descriptions are given about the combination with a component other than epoxy resin and no descriptions are given about physical properties of epoxy resin compositions that can be produced therefrom.

Thus, such conventional techniques have difficulty in providing a cured epoxy resin having both a high elastic modulus and a large nominal compressive strain at break, leading to the problem of trade-off between them.

Accordingly, it could be helpful to provide an epoxy resin composition that produces a cured product having an improved elastic modulus and nominal compressive strain at break as well as a prepreg and a fiber reinforced composite material produced from the epoxy resin composition.

SUMMARY

We thus provide:

An epoxy resin composition including at least components [A], [B], and [C] as listed below:

[A] an epoxy resin as represented by Formula (1) or an epoxy resin as represented by Formula (2),

[A] accounting for 15 to 70 parts by mass relative to the total epoxy resin quantity, which accounts for 100 parts by mass, when [A] is an epoxy resin as represented by Formula (1):

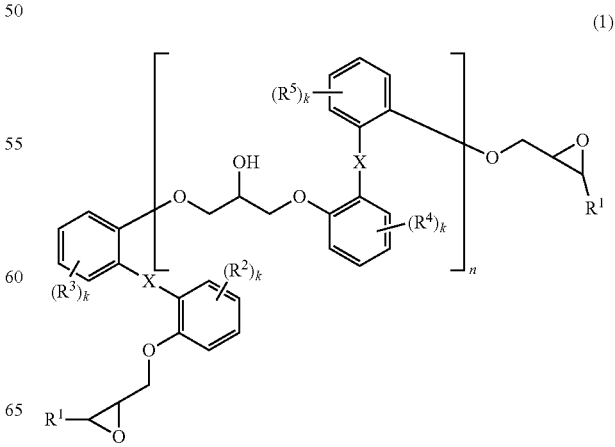

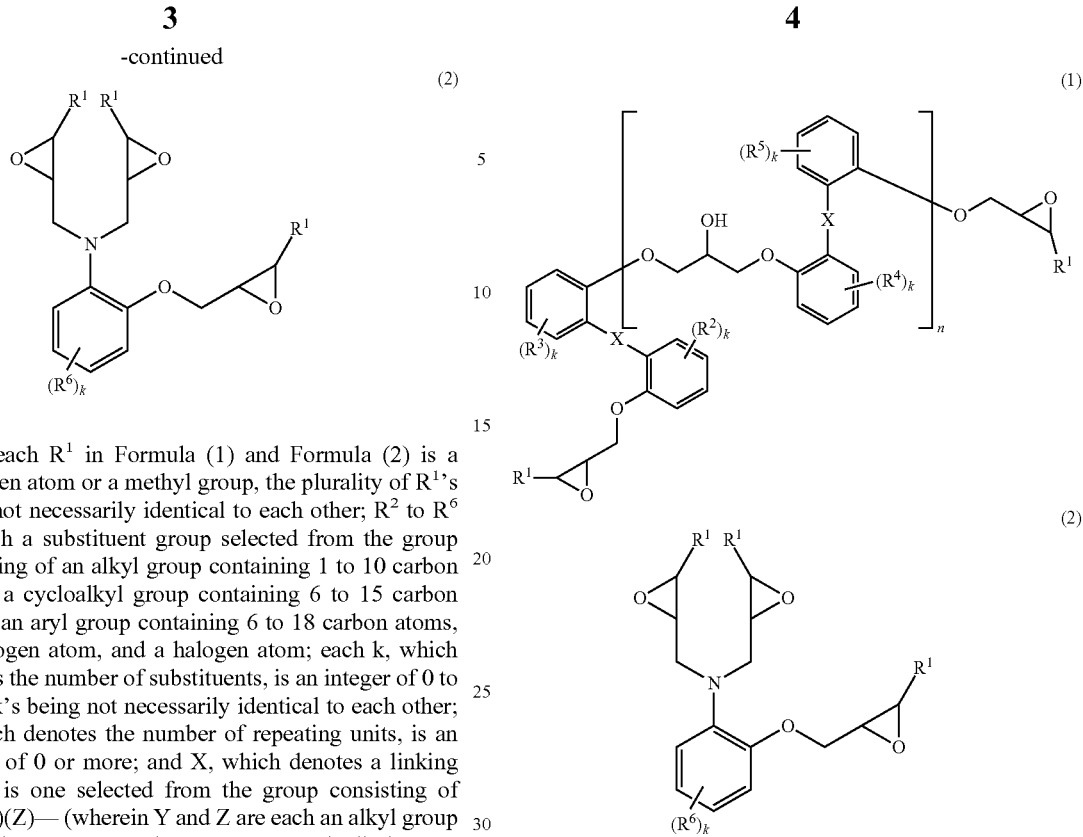

wherein each $R^1$ in Formula (1) and Formula (2) is a hydrogen atom or a methyl group, the plurality of $R^1$'s being not necessarily identical to each other; $R^2$ to $R^6$ are each a substituent group selected from the group consisting of an alkyl group containing 1 to 10 carbon atoms, a cycloalkyl group containing 6 to 15 carbon atoms, an aryl group containing 6 to 18 carbon atoms, a hydrogen atom, and a halogen atom; each k, which denotes the number of substituents, is an integer of 0 to 4, the k's being not necessarily identical to each other; n, which denotes the number of repeating units, is an integer of 0 or more; and X, which denotes a linking group, is one selected from the group consisting of —C(Y)(Z)— (wherein Y and Z are each an alkyl group containing 1 to 10 carbon atoms, a cycloalkyl group containing 6 to 15 carbon atoms, an aryl group containing 6 to 18 carbon atoms, a hydrogen atom, or a halogen atom, Y and Z being either identical to or different from each other), —C(=O)NH—, —C(=O) O—, —S(=O)$_2$—, —C(=O)—, —O—, —S—, and —(no atoms);

[B] at least one component selected from the group consisting of a thermoplastic resins that is compatible with the epoxy resin [A], and core-shell polymers; and

[C] amine curing agent.

The aforementioned epoxy resin composition can be cured to produce cured epoxy resin; the aforementioned epoxy resin composition can impregnate reinforcement fiber to produce prepregs; a fiber reinforced composite material containing the aforementioned cured epoxy resin and reinforcement fiber can be produced; and the prepreg can be cured to produce a fiber reinforced composite material.

We can provide an epoxy resin composition that produces a cured product having an improved elastic modulus and nominal compressive strain at break. In addition, it is possible to provide a prepreg and a fiber reinforced composite material produced from the epoxy resin composition.

DETAILED DESCRIPTION

Described in detail below are our epoxy resin compositions, prepregs, and fiber reinforced composite materials.
Component [A]

The epoxy resin composition includes an epoxy resin as represented by Formula (1) or an epoxy resin as represented by Formula (2), which is referred to as epoxy resin [A]; at least one component selected from the group consisting of thermoplastic resins that is compatible with the epoxy resin [A] and core-shell polymers, which is referred to as component [B], and an amine curing agent, which is referred to as component [C].

wherein each $R^1$ in Formula (1) and Formula (2) is a hydrogen atom or a methyl group; the plurality of $R^1$'s being not necessarily identical to each other; $R^2$ to $R^6$ are each a substituent group selected from the group consisting of an alkyl group containing 1 to 10 carbon atoms, a cycloalkyl group containing 6 to 15 carbon atoms, an aryl group containing 6 to 18 carbon atoms, a hydrogen atom, and a halogen atom; each k, which denotes the number of substituents, is an integer of 0 to 4, the k's being not necessarily identical to each other; n, which denotes the number of repeating units, is an integer of 0 or more; X, which denotes a linking group, is one selected from the group consisting of —C(Y)(Z)— (wherein Y and Z are each an alkyl group containing 1 to 10 carbon atoms, a cycloalkyl group containing 6 to 15 carbon atoms, an aryl group containing 6 to 18 carbon atoms, a hydrogen atom, or a halogen atom, Y and Z being either identical to or different from each other), —C(=O)NH—, —C(=O)O—, —S(=O)$_2$—, —C(=O)—, —O—, —S—, and —(no atoms).

The epoxy resin composition can produce a cured epoxy resin having a very high elastic modulus because it contains the epoxy resin [A], that is, an epoxy resin as represented by Formula (1) or an epoxy resin as represented by Formula (2). It also produces a fiber reinforced composite material having a high compression strength.

In the chemical structure of component [A] which is an epoxy resin as represented by Formula (1) or an epoxy resin as represented by Formula (2), each substituent group denoted by $R^1$ is a hydrogen atom or a methyl group, of which the hydrogen atom is preferred. In the oxirane rings in component [A] which is an epoxy resin as represented by Formula (1) or an epoxy resin as represented by Formula (2), $R^1$'s may be identical to or different from each other.

In the chemical structure of component [A] which is an epoxy resin as represented by Formula (1) or an epoxy resin as represented by Formula (2), $R^2$ to $R^6$ are each a substituent group selected from the group consisting of an alkyl group containing 1 to 10 carbon atoms, a cycloalkyl group containing 6 to 15 carbon atoms, an aryl group containing 6 to 18 carbon atoms, a hydrogen atom, and a halogen atom, of which the hydrogen atom is preferred. In component [A] which is an epoxy resin as represented by Formula (1) or an epoxy resin as represented by Formula (2), furthermore, there are no specific limitations on the positions where $R^2$ to $R^6$ are bonded to the aromatic rings. The value of k, which denotes the number of substituents, is an integer of 0 to 4. When k is two or more, $R^2$ to $R^6$ contained in an aromatic ring may be identical to or different from each other. It is preferable for k to be 0 or 1, particularly preferably 0. For the benzene rings in component [A] which is an epoxy resin as represented by Formula (1) or an epoxy resin as represented by Formula (2), the values of k's, i.e., the numbers of substituents, may be identical to or different from each other. In Formula (1), n denotes the number of repeating units. n is an integer of 0 or more, preferably in the range of 0 to 20, and more preferably in the range of 0 to 5.

In Formula (1), X, which denotes a linking group, is one selected from the group consisting of —C(Y)(Z)—, which is described below, —C(=O)NH—, —C(=O)O—, —S(=O)$_2$—, —C(=O)—, —O—, —S—, and —(no atoms). Of these, as having a very high elastic modulus, X is particularly preferably a linking group selected from the group consisting of —C(Y)(Z)— (wherein the substituent groups denoted by Y and Z are each an alkyl group containing 1 to 10 carbon atoms or a hydrogen atom), —S(=O)$_2$—, —O—, and —(no atoms). When X is —C(Y)(Z)— in Formula (1), the substituent groups denoted by Y and Z are each an alkyl group containing 1 to 10 carbon atoms, a cycloalkyl group containing 6 to 15 carbon atoms, an aryl group containing 6 to 18 carbon atoms, a hydrogen atom, or a halogen atom. In an epoxy resin [A] as represented by Formula (1), Y and Z may be identical to or different from each other.

When component [A] is an epoxy resin as represented by Formula (1), the epoxy resin [A] represented by Formula (1) essentially accounts for 15 to 70 parts by mass relative to the total epoxy resin quantity which accounts for 100 parts by mass, preferably 30 to 60 parts by mass relative to the total epoxy resin quantity which accounts for 100 parts by mass. If it is less than 15 parts by mass, the resulting cured epoxy resin will lack in elastic modulus. If it is more than 70 mass %, on the other hand, it will lead to a cured epoxy resin having a decreased nominal compressive strain at break, resulting in a fiber reinforced composite material lacking in interlaminar toughness.

When component [A] is an epoxy resin as represented by Formula (2), the epoxy resin [A] represented by Formula (2) preferably accounts for 5 parts by mass or more and less than 30 parts by mass relative to the total epoxy resin quantity which accounts for 100 parts by mass, more preferably 10 parts by mass or more and less than 25 parts by mass relative to the total epoxy resin quantity which accounts for 100 parts by mass. If it is less than 5 parts by mass, the resulting cured epoxy resin will lack in elastic modulus, possibly leading to a fiber reinforced composite material with a decreased compressive strength. If it is 30 mass % or more, on the other hand, it will lead to a cured epoxy resin having a decreased nominal compressive strain at break, possibly resulting in a fiber reinforced composite material lacking in interlaminar toughness.

An epoxy resin [A] as represented by Formula (1) can be synthesized by a method as disclosed in Japanese Unexamined Patent Publication No. SHO58-140089. The synthesis method is described below.

An epoxy resin [A] as represented by Formula (1) can be produced by, for example, reacting a compound as represented by Formula (3) below (for example, 2,2'-dihydroxydiphenyl methane, X=CH$_2$, $R^2$ and $R^3$=hydrogen atoms, k=0, n=0) with a compound as represented by Formula (4) below (for example, epichlorohydrin).

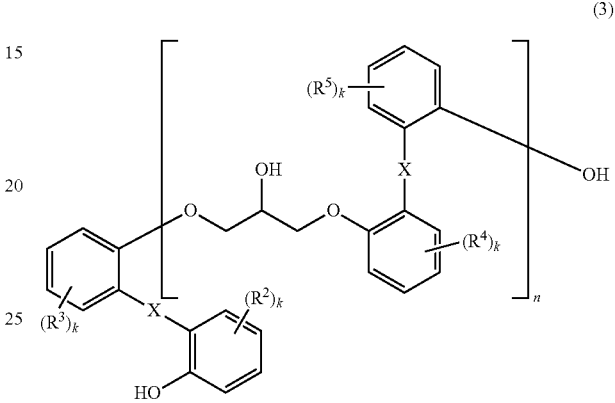

(3)

wherein, X, $R^2$ to $R^5$, k, and n are the same as for Formula (1).

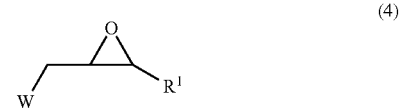

(4)

wherein $R^1$ is the same as for Formula (1), and W is a halogen atom.

For a compound as represented by Formula (4), the halogen atom denoted by W may be, for example, the chlorine atom, bromine atom, iodine atom, or the like, of which the chlorine atom and bromine atom are preferable and the chlorine atom is particularly preferable. Specific examples of compounds as represented by Formula (4) include epichlorohydrin, epibromohydrin, chloromethyl oxirane, and bromomethyl oxirane.

A compound as represented by Formula (3) and an excessive quantity of a compound as represented by Formula (4) are subjected to addition reaction in the presence of a catalyst such as phosphonium salt and quaternary ammonium salt, and then an alkali metal hydroxide is added to cause cyclization reaction, thereby producing an epoxy resin as represented by Formula (1).

First, the addition reaction is carried out at 40° C. to 150° C., preferably at 70° C. to 140° C., and subsequently the cyclization reaction is carried out at 20° C. to 150° C., preferably at 40° C. to 80° C.

The quantity of the compound represented by Formula (4) is 2 to 20 times in moles, preferably 8 to 12 times in moles, as large as the quantity of the compound represented by Formula (3).

The quantity of the catalyst such as phosphonium salt and quaternary ammonium salt is 0.01 to 0.1 times in moles as large as that of the compound represented by Formula (3).

The quantity of the alkali metal hydroxide is at least the same in moles as, preferably 1.05 to 1.5 times in moles as large as, that of the hydroxyl groups in the compound represented by Formula (3).

The cyclization reaction may be carried out under atmospheric pressure or a reduced pressure of 50 to 200 mmHg while removing the resulting water through azeotropic distillation with the compound represented by Formula (4).

After the completion of the cyclization reaction, the unreacted remainder of the compound represented by Formula (4) is recovered under reduced pressure and dissolved in a water-insoluble organic solvent such as methyl ethyl ketone, methyl isobutyl ketone, and toluene, and this diluted reaction solution is rinsed with water to allow inorganic impurities such as sodium chloride to be dissolved in the water phase, followed by evaporation of the organic solvent and purification.

Useful phosphonium salts to serve as the catalyst include tetraphenylphosphonium halides. Examples of the tetraphenylphosphonium halides include tetraphenyl hosphonium bromide and tetraphenylphosphonium chloride.

Useful quaternary ammonium salts to serve as the catalyst include tetramethylammonium chloride, tetraethylammonium bromide, triethylmethylammonium chloride, and triethylmethylammonium bromide. Particularly preferred catalysts include tetramethylammonium chloride and tetraethylammonium bromide.

Useful alkali metal hydroxides include potassium hydroxide and sodium hydroxide.

An epoxy resin [A] as represented by Formula (2) can be synthesized by a method as disclosed in Japanese Unexamined Patent Publication No. SHO62-74918. The synthesis method is described below.

An epoxy resin [A] as represented by Formula (2) can be produced by, for example, reacting a compound as represented by Formula (5) below (for example, 2-aminophenol, $R^6$=hydrogen atom, k=0) with a compound as represented by Formula (4) (for example, epichlorohydrin).

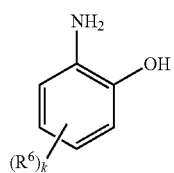

(5)

wherein, $R^6$ and k are the same as for Formula (2).

A compound as represented by Formula (5) and an excessive quantity of a compound as represented by Formula (4) are heated to undergo addition reaction, and then an alkali metal hydroxide is added to cause cyclization reaction, thereby producing an epoxy resin as represented by Formula (2).

First, the addition reaction is carried out at 100° C. or less, and then the cyclization reaction is carried out at 40° C. to 100° C.

The quantity of the compound represented by Formula (4) is 2 to 20 times in moles, preferably 8 to 15 times in moles, as large as the quantity of the compound represented by Formula (5).

The quantity of the alkali metal hydroxide is at least the same in moles as, preferably 1.05 to 1.5 times in moles as large as, that of the amino groups and the hydroxyl groups in the compound represented by Formula (4).

The cyclization reaction may be carried out under atmospheric pressure or a reduced pressure of 50 to 200 mmHg while removing the resulting water through azeotropic distillation with the compound represented by Formula (4).

After completion of the cyclization reaction, the unreacted remainder of the compound represented by Formula (4) is recovered under reduced pressure and dissolved in a water-insoluble organic solvent such as methyl ethyl ketone, methyl isobutyl ketone, and toluene, and this diluted reaction solution is rinsed with water to allow inorganic impurities such as sodium chloride to be dissolved in the water phase, followed by evaporation of the organic solvent and purification.

Useful alkali metal hydroxides include potassium hydroxide and sodium hydroxide.

Component [B]

It is essential for the epoxy resin composition to contain component [B] which is at least one selected from the group consisting of thermoplastic resins that is compatible with the epoxy resin [A], and core-shell polymers. As a result, the brittleness of the epoxy resin is compensated for by the toughness of component [B] whereas the low elastic modulus of component [B] is compensated for by the epoxy resin, thus allowing the nominal compressive strain at break to be improved considerably while ensuring that the resulting cured epoxy resin will have a high elastic modulus. The use of such an epoxy resin composition enables the production of a fiber reinforced composite material with a noticeably improved compression strength and interlaminar toughness.

There are no specific limitations on the thermoplastic resin [B] that is compatible with the epoxy resin [A] as long as it is compatible with the epoxy resin [A]. If the thermoplastic resin [B] that is compatible with the epoxy resin [A] is not in a uniformly mixed state, the existence of an incompletely mixed part of the thermoplastic resin can lead to a cured epoxy resin having a decreased elastic modulus, possibly resulting in a fiber reinforced composite material having a poor compression strength.

The expression of "mixing uniformly" means that when the thermoplastic resin [B] that is compatible with the epoxy resin [A] is combined with the epoxy resin [A] to cause them to coexist, there are conditions where the two components can mix uniformly at a molecular level with each other. Such conditions include environment temperature, shear velocity, and treatment time, as well as morphology and content ratio of the two components. Commonly, mixing is performed under conditions that ensure easy uniform mixing. Specifically, [B] is powdered as finely as possible and dispersed in an as large an amount as possible of [A] and they are kneaded under the conditions of a maximum possible temperature, shear velocity, and treatment period where they will not suffer from chemical changes such as modification, followed by determining whether they are in a uniformly mixed state. Such determination is performed by, for example, using a transmission type optical microscope to observe whether there exist parts of [B] left undissolved. If the different phases containing the different substances as primary components form a phase separated structure of less than 500 nm, it will be difficult to identify them in different phases by a transmission type optical microscope, and it is assumed that they are in a uniformly mixed state.

As described above, an appropriate region is photographed by a microscope to determine whether the epoxy resin composition is in a uniformly mixed state. Such an appropriate region is found as follows in a microscopic photograph. Specifically, if the insoluble parts of [B] are expected to have a size of the order of 1 μm (1 μm or more and less than 10 μm), a photograph is taken at a magnification of 200 times.

There are no specific limitations on the core-shell polymer [B] as long as it consists mainly of a core constituent in the form of particles containing a crosslinked rubbery polymer or elastomer as the primary component and a shell constituent that is primarily of a dissimilar polymer to the core constituent and graft-polymerized therewith over the surface thereof to form particles of the core constituent with their surfaces covered partly or entirely with the shell constituent. The primary component refers to the one that accounts for 50 mass % or more and 100 mass % or less of the total quantity, which accounts for 100 mass %, of the core component.

Useful materials for the core component to form such a core-shell polymer include polymers produced through polymerization of at least one selected from the group consisting of conjugated diene based monomers and acrylate or methacrylate based monomers as well as silicone resin, but it is particularly preferable that a crosslinked polybutadiene formed through polymerization of butadiene, which works as a conjugated diene based monomer, be used as the core component because it can ensure improved fracture toughness at very low temperatures.

It is preferable that the shell component used to from a core-shell polymer be graft-polymerized onto the aforementioned core component to be chemically bonded to the polymer of the core constituent. Useful materials for such a shell constituent include, for example, polymers produced through polymerization of at least one selected from (meth) acrylates, aromatic vinyl compounds, and the like.

It is preferable for the shell component to contain a functional group that can react with the epoxy resin composition to ensure a stably dispersed state. Examples of such a functional group include hydroxyl group, carboxyl group, and epoxy group.

There are no specific limitations on the core-shell polymer, and those produced by a generally known method can be used. However, although such core-shell polymers are commonly prepared by producing lumps and pulverizing them into powder, and in many cases, such powdery core-shell polymer particles are dispersed again in epoxy resin, it is difficult for this method to disperse them in the form of primary particles in a stable state. It is preferable therefore that a master batch of primary particles dispersed in epoxy resin be finally obtained without separating the material in the form of lumps during the core-shell polymer production process. For example, such a method as described in Japanese Unexamined Patent Publication (Kokai) No. 2004-315572 may be adopted to produce a core-shell polymer by a polymerization technique that performs polymerization in a water medium such as emulsion polymerization, dispersion polymerization, and suspension polymerization, to obtain a suspension liquid that contains the core-shell polymer in a dispersed state. The resulting suspension may be mixed with an organic solvent with a partial solubility in water such as acetone, methyl ethyl ketone, and other ether solvents, and brought into contact with an aqueous electrolyte such as sodium chloride and potassium chloride to effect phase separation between an organic solvent layer and a water layer, followed by removing the water layer to separate the organic solvent containing the dispersed core-shell polymer, adding an appropriate amount of epoxy resin, and finally removing the organic solvent by evaporation.

Commercially available products of such core-shell polymers include, for instance, "Paraloid (registered trademark)" EXL-2655 (manufactured by Kureha Corporation), which contains a butadiene-alkyl methacrylate-styrene copolymer, Stafiloid (registered trademark) AC-3355 and TR-2122 (manufactured by Takeda Pharmaceutical Company Limited), which are acrylate-methacrylate copolymers, Paraloid (registered trademark) EXL-2611 and EXL-3387 (manufactured by Rohm and Haas Company), which are butyl acrylate-methyl methacrylate copolymers, and Kane Ace (registered trademark) MX series (manufactured by Kaneka Corporation).

It is preferable for such a core-shell polymer [B] to have an average particle diameter of 500 nm or less. If it is more than 500 nm, the elastic modulus may decrease, possibly resulting in a fiber reinforced composite material with poor compression strength. It is more preferably 1 nm or more and 300 nm or less, and still more preferably 5 nm or more and 100 nm or less.

To determine the average particle diameter of core-shell polymer particles, a cross section of a cured resin specimen is observed by scanning electron microscopy or transmission electron microscopy and the diameters of at least 50 or more particles are measured, followed by calculating the number average of the particle diameter measurements to obtain the average particle diameter. For non-perfect circular, such as elliptic, particles in the observation, their largest diameters are taken as their particle diameters.

Component [C]

It is essential to use an amine curing agent [C] for the epoxy resin composition.

Such an amine curing agent [C] is a curing agent for the epoxy resin contained in the epoxy resin composition, and it is a compound having an active group that can react with the epoxy group. Examples of the amine curing agent [C] include aromatic polyamines, dicyandiamides, aminobenzoic acid esters, imidazole derivatives, aliphatic amines, tetramethyl guanidine, thiourea-added amines, carboxylic acid hydrazides, and Lewis acid complexes such as boron trifluoride—ethylamine complex.

Commonly, trade-off relation exists between the elastic modulus and nominal compressive strain at break of cured epoxy resin. There are two major types of preferred epoxy resin compositions, that is, those according to structure 1 where greater importance is attached to elastic modulus and those according to structure 2 where greater importance is attached to strain.

Epoxy Resin Compositions According to Structure 1

The epoxy resin compositions according to structure 1 are described in detail below.

An epoxy resin composition according to this structure preferably contains an epoxy resin as represented by Formula (1) or an epoxy resin as represented by Formula (2), which is referred to as epoxy resin [A]; at least one component selected from the group consisting of thermoplastic resins that is compatible with the epoxy resin [A], and core-shell polymers, which is referred to as component [B], and an aromatic amine to work as amine curing agent, which is referred to as component [C].

Specific examples of the aromatic amine to work as amine curing agent [C] include, for example, 4,4'-diaminodiphenyl methane, 3,3'-diaminodiphenyl sulfone, 4,4'-diaminodiphenyl sulfone, 3,3'-diisopropyl-4,4'-diaminodiphenyl methane, 3,3'-di-t-butyl-4,4'-diaminodiphenyl methane, 3,3'-diethyl-5,5'-dimethyl-4,4'-diaminodiphenyl methane, 3,3'-di-t-butyl-5,5'-dimethyl-4,4'-diaminodiphenyl methane, 3,3',5,5'-tetraethyl-4,4'-diaminodiphenyl methane, 3,3'-diisopropyl-5,5'-diethyl-4,4'-diaminodiphenyl methane, 3,3'-di-t-butyl-5,5'-diethyl-4,4'-diaminodiphenyl methane, 3,3'-di-t-butyl- 5,5'-diisopropyl-4,4'-diaminodiphenyl methane, and 3,3',5,5'-tetra-t-butyl-4,4'-diaminodiphenyl methane. In particular, the aromatic amine is preferably diaminodiphenyl sulfone or a derivative thereof from the viewpoint of heat resistance and mechanical characteristics.

Commercially available products of diaminodiphenyl sulfone, derivatives thereof, or isomers thereof include Seikacure S (manufactured by Wakayama Seika Kogyo Co., Ltd.), 3,3'-DAS (manufactured by Mitsui Fine Chemical, Inc.), Kayahard (registered trademark) A-A (manufactured by Nippon Kayaku Co., Ltd.), Lonzacure (registered trademark) M-DEA, Lonzacure (registered trademark) M-MIPA, and Lonzacure (registered trademark) M-DIPA (all manufactured by Lonza Japan).

Epoxy Resin [D]

According to this structure, a polyfunctional amine type epoxy resin [D] is preferably contained in addition to an epoxy resin [A] as represented by Formula (2). There are no specific limitations on the polyfunctional amine type epoxy resin [D] as long as it contains three or more glycidyl groups. The addition of such a polyfunctional amine type epoxy resin [D] serves to minimize the viscosity increase in the epoxy resin composition while ensuring the production of a cured epoxy resin having a required elastic modulus, and heat resistance and a fiber reinforced composite material having a largely improved compression strength.

In particular, the use of the polyfunctional amine type epoxy resin [D] in combination with the epoxy resin [A], the thermoplastic resin [B], and diaminodiphenyl sulfone as the amine curing agent [C] produces an epoxy resin composition having a moderately high crosslink density. For example, this suggests that the epoxy resin composition may be used for aircraft material manufacturing to provide a cured epoxy resin that suffers little elastic modulus at high temperature and high humidity that the aircraft material may be exposed to and provide a fiber reinforced composite material that maintains a high compression strength.

Examples of the polyfunctional amine type epoxy resin [D] include tetraglycidyl diaminodiphenyl methane, tetraglycidyl diaminodiphenyl sulfone, and tetraglycidyl xylylene diamine; triglycidyl aminophenol and triglycidyl aminocresol other than the epoxy resin [A] represented by Formula (2); and halogen-substituted, alkyl-substituted, or hydrogenated forms thereof.

Usable commercially available products of tetraglycidyl diaminodiphenyl methane include SUMI-EPDXY (registered trademark) ELM434 (manufactured by Sumitomo Chemical Co., Ltd.), YH434L (manufactured by Nippon Steel & Sumikin Chemical Co., Ltd.), jER (registered trademark) 604 (manufactured by Mitsubishi Chemical Corporation), and Araldite (registered trademark) MY720, Araldite (registered trademark) MY721, and Araldite (registered trademark) MY9512 (all manufactured by Huntsman Japan KK).

Commercially available products of tetraglycidyl diaminodiphenyl sulfone include TG3DAS (manufactured by Mitsui Fine Chemical, Inc.).

Usable commercially available products of tetraglycidyl xylylene diamines and hydrogenated products thereof include Tetrad (registered trademark)-X and Tetrad (registered trademark)-C (both manufactured by Mitsubishi Gas Chemical Co., Inc.).

Useful commercially available products of triglycidyl aminophenol or triglycidyl aminocresol other than the epoxy resin [A] represented by Formula (2) include SUMI-EPDXY (registered trademark) ELM100, SUMI-EPDXY (registered trademark) ELM120 (both manufactured by Sumitomo Chemical Co., Ltd.), Araldite (registered trademark) MY0500, Araldite (registered trademark) MY0510, and Araldite (registered trademark) MY0600 (all manufactured by Huntsman Japan KK), and jER (registered trademark) 630 (manufactured by Mitsubishi Chemical Corporation).

The polyfunctional amine type epoxy resin [D] preferably accounts for 20 to 70 parts by mass relative to the total epoxy resin quantity which accounts for 100 parts by mass, more preferably 30 to 60 parts by mass relative to the total epoxy resin quantity which accounts for 100 parts by mass. If it is less than 20 parts by mass, the resulting cured epoxy resin will lack in elastic modulus, possibly leading to a fiber reinforced composite material with a decreased compression strength. If it is more than 70 parts by mass, on the other hand, the crosslink density can increase very largely to cause a very large decrease in elongation percentage, possibly leading to a cured resin with a very small strain at compression failure.

For this structure, the thermoplastic resin [B] that is compatible with the epoxy resin [A] preferably has a glass transition temperature (occasionally referred to as Tg) of 150° C. or more, more preferably 180° C. or more, and still more preferably 220° C. or more. If the thermoplastic resin [B] has a glass transition temperature of less than 150° C., it may lead to a molded product that can suffer from heat deformation easily. The glass transition temperature of the thermoplastic resin [B] is determined by performing DSC (differential scanning calorimetry) in the temperature range of 0° C. to 350° C. at a heating rate of 10° C./min and calculating the midpoint temperature according to JIS K7121-1987.

Substances that can serve as the thermoplastic resin [B] include polycarbonate (Tg: 150° C.), polysulfone (Tg: 190° C.), polyether imide (Tg: 215° C.), and polyether sulfone (Tg: 225° C.).

Commercially available products of polycarbonate include Panlite (registered trademark) K1300Y (manufactured by Teijin Limited).

Commercially available products of polysulfone include UDEL (registered trademark) P-1700, UDEL (registered trademark) P-3500, and Virantage (registered trademark) VW-30500RP (all manufactured by Solvay Speciality Polymers).

Commercially available products of polyetherimide include Ultem (registered trademark) 1000 and Ultem (registered trademark) 1010 (both manufactured by SABIC).

Commercially available products of polyether sulfone include SUMIKAXCEL (registered trademark) PES3600P, SUMIKAXCEL (registered trademark) PES5003P, SUMIKAXCEL (registered trademark) PES5200P, SUMIKAXCEL (registered trademark) PES7600P (all manufactured by Sumitomo Chemical Co., Ltd.), Ultrason (registered trademark) E2020P SR (manufactured by BASF), GAFONE (registered trademark) 3600R, GAFONE (registered trademark) 3000R, and Virantage (registered trademark) VW-10700RP (all manufactured by Solvay Speciality Polymers).

The thermoplastic resin [B] compatible with the epoxy resin [A] preferably accounts for 5 to 35 parts by mass relative to the total epoxy resin quantity which accounts for 100 parts by mass, and more preferably 10 to 25 parts by mass relative to the total epoxy resin quantity which accounts for 100 parts by mass. The core-shell polymer [B] preferably accounts for 0.1 to 1 part by mass relative to the total epoxy resin quantity which accounts for 100 parts by mass, and more preferably 0.5 to 8 parts by mass relative to the total epoxy resin quantity which accounts for 100 parts by mass. If it is less than the lower limit, it will lead to a cured epoxy resin having a decreased nominal compressive strain at break, possibly resulting in a fiber reinforced composite material having insufficient interlaminar toughness. If it is more than the upper limit, on the other hand, the epoxy resin composition will suffer from an increase in viscosity and accordingly, the epoxy resin composition and prepreg produced therefrom will be likely to fail to have sufficiently high processability and handleability.

Thermoplastic Resin Particles [E]

According to this structure, furthermore, it is preferable to add thermoplastic resin particles [E] that are insoluble in epoxy resin [A] and of at least one material selected from the group consisting of polyamide, polyimide, polyamide-imide, polycarbonate, and polyphenylene sulfide. The addition of such thermoplastic resin particles [E] leads to a cured epoxy resin with an improved strain at compression failure and a fiber reinforced composite material with improved interlayer ductility.

The expression "being insoluble" means that the thermoplastic resin particles [E] substantially do not dissolve in the epoxy resin [A] when the epoxy resin [A] containing the thermoplastic resin particles [E] are heat-cured. This is confirmed by, for example, observation showing that particles in the cured epoxy resin maintain their original sizes without substantial size reduction and definite interfaces exist between the particles and the matrix resin.

To determine the phase structure of the cured epoxy resin as described above, the following procedure, for example, may be carried out for measurement. The surface of a cured epoxy resin specimen is polished and then photographed at a magnification of 200 or more using a transmission electron microscope.

The thermoplastic resin particles [E] are preferably of at least one material selected from the group consisting of polyamide, polyimide, polyamide-imide, polycarbonate, and polyphenylene sulfide. Of these, polyamide is the most preferable, and preferable polyamide compounds include nylon 12, nylon 6, nylon 11, nylon 6/12 copolymers, and transparent, heat resistant polyamide products such as Grilamid (registered trademark) TR-55, Grilamid (registered trademark) TR-90, and Grilamid (registered trademark) TR-70LX (all manufactured by Emser Werke, Inc.). In regard to the shape of the thermoplastic resin particles [E] that are insoluble in epoxy resin [A], they may be spherical particles, non-spherical particles, or porous particles, of which spherical particles are preferable because they ensure high viscoelasticity by preventing deterioration in the flow characteristics of the resin and also ensure high interlaminar toughness by eliminating potential starting points of stress concentrations.

Commercially available products of polyamide particles include SP-500, SP-10 (both manufactured by Toray Industries, Inc.), Orgasol (registered trademark) 1002D, Orgasol (registered trademark) 2002, Orgasol (registered trademark) 3202 (all manufactured by Arkema), and Trogamid (registered trademark) T5000 (manufactured by Daicel-Evonik Ltd.).

Epoxy Resin Compositions According to Structure 2

The epoxy resin compositions according to structure 2 are described in detail below.

An epoxy resin composition according to this structure preferably contains an epoxy resin as represented by Formula (1) or an epoxy resin as represented by Formula (2), which is referred to as epoxy resin [A]; at least one component selected from the group consisting of thermoplastic resins that is compatible with the epoxy resin [A], and core-shell polymers, which is referred to as component [B], and dicyandiamide or a derivative thereof to work as amine curing agent, which is referred to as component [C].

The use of dicyandiamide or a derivative thereof as amine curing agent [C] is effective because of a good balance among curability at low temperatures, elastic modulus, and elongation percentage, as well as high storage stability of the resin composition although inferior in heat resistance compared with the use of diaminodiphenyl sulfone or a derivative or isomer thereof.

Such dicyandiamide derivatives are formed by bonding dicyandiamide to various compounds and may be in the form of reaction products with epoxy resin, vinyl compounds, acrylic compounds or the like.

Commercially available products of dicyandiamide include DICY-7 and DICY-15 (both manufactured by Mitsubishi Chemical Corporation).

Dicyandiamide may be used alone or in combination with a curing catalyst for dicyandiamide or a curing agent for epoxy resin. Such curing catalysts for dicyandiamide to be combined include urea based, imidazole based, and Lewis acid based catalysts. Commercially available products of urea based ones include DCMU 99 (manufactured by Hodogaya Chemical Co., Ltd.), Omicure 24, Omicure 52, and Omicure 94 (all manufactured by CVC Specialty Chemicals, Inc.).

Commercially available products of imidazole based ones include 2MZ, 2PZ, and 2E4MZ (all manufactured by Shikoku Chemicals Corporation).

Such Lewis acid catalysts include complexes of halogenated boron and a base such as boron trifluoride/piperidine complexes, boron trifluoride/monoethyl amine complexes, boron trifluoride/triethanol amine complexes, and boron trifluoride/octyl amine complexes.

Epoxy Resin [F]

For this structure, it is preferable to add an epoxy resin [F] having an epoxy equivalent of 300 to 5,000 and having a bisphenol backbone. There are no specific limitations on the epoxy resin [F] having a bisphenol backbone as long as it is an epoxy resin having an epoxy equivalent in the specified range and having a bisphenol backbone. The addition of the epoxy resin [F] having a bisphenol backbone forms a cured epoxy resin having a high elastic modulus and a high elongation percentage to ensure the production of a fiber reinforced composite material having a largely improved interlaminar toughness.

In particular, the combined use of component [F] with the epoxy resin [A], component [B] which is at least one selected from the group consisting of thermoplastic resins compatible with the epoxy resin [A], and core-shell polymers, and dicyandiamide adopted as the amine curing agent [C] can serve to ensure required interlaminar toughness without suffering from deterioration in static mechanical characteristics such as elastic modulus. This particularly advantageous in the field of manufacturing of sporting goods that require high impact resistance.

Component [F] which is an epoxy resin having a bisphenol backbone preferably has an epoxy equivalent of 300 to 5,000, more preferably 800 to 2,500. An epoxy equivalent of less than 300 can lead to a cured epoxy resin with a high crosslink density, possibly resulting in a fiber reinforced composite material with a decreased interlaminar toughness that can easily undergo impact damage. An epoxy equivalent of more than 5,000 can lead to a cured epoxy resin with a decreased crosslink density and accordingly an insufficient heat resistance, possibly resulting in a fiber reinforced composite material that suffers from warp and distortion during its molding or when in use.

The epoxy equivalent can be determined by the titration test specified in JIS K7236 (2001), but when combining a plurality of epoxy resins each having a known epoxy equivalent, the epoxy equivalent of the mixture can be roughly calculated as described below. It is assumed to use three components. For example, when combining Wx parts by mass of epoxy resin X having an epoxy equivalent of Ex (g/eq), Wy parts by mass of epoxy resin Y having an epoxy equivalent of Ey (g/eq), and Wz parts by mass of epoxy resin Z having an epoxy equivalent of Ez (g/eq), the epoxy equivalent of the mixture is given by the equation below:

$$\text{Epoxy equivalent} = (Wx+Wy+Wz)/(Wx/Ex+Wy/Ey+Wz/Ez).$$

The epoxy resin [F] having a bisphenol backbone preferably accounts for 20 to 60 parts by mass relative to the total epoxy resin quantity which accounts for 100 parts by mass, and more preferably 25 to 50 parts by mass relative to the total epoxy resin quantity which accounts for 100 parts by mass. If it is less than 20 parts by mass, the resulting cured epoxy resin will lack in plastic deformability, possibly leading to a fiber reinforced composite material with an insufficient interlaminar toughness. If it is more than 60 parts by mass, the resulting cured epoxy resin will lack in heat resistance, possibly leading to a fiber reinforced composite material that suffers from warp and distortion during its molding.

Useful substances for the epoxy resin [F] having a bisphenol backbone include bisphenol-backbone-containing epoxy resins such as bisphenol A type, bisphenol F type, bisphenol S type, bisphenol AD type, urethane- or isocyanate-modified epoxy compounds, and halogen-substituted, alkyl-substituted, or hydrogenated forms of these bisphenols. Specific examples of such epoxy resins include the following.

Commercially available products of bisphenol A type epoxy resin include jER (registered trademark) 1001, jER (registered trademark) 1004, jER (registered trademark) 1007, jER (registered trademark) 1009, and jER (registered trademark) 1010 (all manufactured by Mitsubishi Chemical Corporation).

Commercially available products of bisphenol F type epoxy resin include jER (registered trademark) 4004P, jER (registered trademark) 4005P, jER (registered trademark) 4007P, jER (registered trademark) 4010P (all manufactured by Mitsubishi Chemical Corporation), and EPOTOHTO (registered trademark) YDF-2001 (manufactured by Nippon Steel & Sumikin Chemical Co., Ltd.).

Commercially available products of urethane-modified epoxy resin include AER4152 (manufactured by Asahi Kasei E-materials Corp.), which has an oxazolidone ring.

For this structure, the thermoplastic resin [B] that is compatible with the epoxy resin [A] preferably has a glass transition temperature (occasionally referred to as Tg) of 60° C. to less than 150° C., more preferably 80° C. to 140° C. If the glass transition temperature is less than 60° C., the resulting moldings may suffer from heat deformation easily. If it is more than 150° C., on the other hand, it will be difficult to control the viscoelasticity, making it difficult to provide a prepreg with improved tack and drape characteristics.

Substances that can serve as the thermoplastic resin [B] include polyvinyl acetal resin (Tg: 100° C. to 145° C.), polyvinyl alcohol (Tg: 80° C. to 100° C.), and phenoxy resin (Tg: 60° C. to 140° C.). Polyvinyl formal, in particular, can be used suitably because it is so high in compatibility epoxy as to serve to produce a fiber reinforced composite material with high interlaminar toughness.

More specifically, commercially available products of polyvinyl acetal resin include Denka Formal (registered trademark), Denka Butyral (registered trademark) (both manufactured by Denki Kagaku Kogyo Kabushiki Kaisha), and Vinylec (registered trademark) K (manufactured by JNC Corporation).

Commercially available products of phenoxy resin include UCAR (registered trademark) PKHP (manufactured by Union Carbide Corporation), Phenototo (registered trademark) YP-50 and Phenototo (registered trademark) YP-50S (both manufactured by Nippon Steel & Sumikin Chemical Co., Ltd.).

Such a thermoplastic resin [B] compatible with the epoxy resin [A] preferably accounts for 2 to 20 parts by mass relative to the total epoxy resin quantity which accounts for 100 parts by mass, and more preferably 3 to 8 parts by mass relative to the total epoxy resin quantity which accounts for 100 parts by mass. The core-shell polymer [B] preferably accounts for 0.1 to 10 parts by mass relative to the total epoxy resin quantity which accounts for 100 parts by mass, and more preferably 0.5 to 8 parts by mass relative to the total epoxy resin quantity which accounts for 100 parts by mass. If it is less than the lower limit, it will lead to a cured epoxy resin having a decreased nominal compressive strain at break, possibly resulting in a fiber reinforced composite material failing to have a sufficient interlaminar toughness. If it is more than the upper limit, on the other hand, the epoxy resin composition will suffer from an increase in viscosity and accordingly, the epoxy resin composition and prepreg produced therefrom will possibly fail to have a sufficiently high processability and handleability.

Other Epoxy Resins

The epoxy resin composition may further contain another epoxy resin component in addition to "an epoxy resin as represented by Formula (1) or an epoxy resin as represented by Formula (2), which is referred to as component [A]; a polyfunctional amine type epoxy resin [D]; and an epoxy resin having a bisphenol backbone and having an epoxy equivalent in the range of 300 to 5,000, which is denoted as [F]." Such a component may be a single epoxy resin or a combination of a plurality of epoxy resins. Specific examples include phenol novolac type epoxy resin, cresol novolac type epoxy resin, resorcinol type epoxy resin, dicyclopentadiene type epoxy resin, epoxy resin with a biphenyl backbone, epoxy resin with a fluorene backbone, epoxy resin with a bisphenol backbone other than [F], and halogen-substituted, alkyl-substituted, or hydrogenated forms of such bisphenols. Examples of the epoxy resin having a bisphenol backbone include bisphenol A type, bisphenol F type, bisphenol S type, bisphenol AD type, urethane- or isocyanate-modified epoxy resin compounds, and halogen-substituted, alkyl-substituted, or hydrogenated forms of these bisphenols. Specific products of such epoxy resins include the following.

Commercially available products of phenol novolac type epoxy resin include jER (registered trademark) 152, jER (registered trademark) 154 (both manufactured by Mitsubishi Chemical Corporation), Epicron (registered trademark) N-740, Epicron (registered trademark) N-770, and Epicron (registered trademark) N-775 (all manufactured by DIC Corporation).

Commercially available products of cresol novolac type epoxy resin include Epicron (registered trademark) N-660, Epicron (registered trademark) N-665, Epicron (registered trademark) N-670, Epicron (registered trademark) N-673, and Epicron (registered trademark) N-695 (all manufactured by DIC Corporation), and EOCN-1020, EOCN-1025, and EOCN-1045 (all manufactured by Nippon Kayaku Co., Ltd.), and SUMI-EPDXY (registered trademark) ESCN-195XF and 195XL (both manufactured by Sumitomo Chemical Co., Ltd.).

Commercially available products of resorcinol type epoxy resin include Denacol (registered trademark) EX-201 (manufactured by Nagase ChemteX Corporation).

Commercially available products of dicyclopentadiene type epoxy resin include Epicron (registered trademark) HP7200, Epicron (registered trademark) HP7200L, and Epicron (registered trademark) HP7200H (all manufactured by DIC Corporation), Tactix 558 (manufactured by Huntsman Japan KK), XD-1000-1L and XD-1000-2L (both manufactured by Nippon Kayaku Co., Ltd.).

Commercially available products of epoxy resin with a biphenyl backbone include jER (registered trademark) YX4000H, jER (registered trademark) YX4000, and jER (registered trademark) YL6616 (all manufactured by Mitsubishi Chemical Corporation), and NC-3000 (manufactured by Nippon Kayaku Co., Ltd.).

Commercially available products of epoxy resin with a fluorene backbone include Oncoat (registered trademark) EX-1010, Oncoat (registered trademark) EX-1011, Oncoat (registered trademark) EX-1012, Oncoat (registered trademark) EX-1020, Oncoat (registered trademark) EX-1030, Oncoat (registered trademark) EX-1040, Oncoat (registered trademark) EX-1050, and Oncoat (registered trademark) EX-1051 (all manufactured by Nagase ChemteX Corporation).

Commercially available products of bisphenol A type epoxy resin include EPOTOHTO (registered trademark) YD128 (manufactured by Nippon Steel & Sumikin Chemical Co., Ltd.), jER (registered trademark) 825, jER (registered trademark) 828, and jER (registered trademark) 834 (all manufactured by Mitsubishi Chemical Corporation).

Commercially available products of bisphenol F type epoxy resin include Epicron (registered trademark) 830 and Epicron (registered trademark) 835 (both manufactured by DIC Corporation), jER (registered trademark) 806 and jER (registered trademark) 807 (both manufactured by Mitsubishi Chemical Corporation), and EPOTOHTO (registered trademark) YDF170 (manufactured by Nippon Steel & Sumikin Chemical Co., Ltd.).

Commercially available products of bisphenol S type epoxy resin include Epicron (registered trademark) EXA-1514 (manufactured by DIC Corporation).

Commercially available products of bisphenol AD type epoxy resin include EPOMIK (registered trademark) R710 and EPOMIK (registered trademark) R1710 (both manufactured by Printec, Inc.).

Commercially available products of urethane- or isocyanate-modified epoxy resin include Adekaresin (registered trademark) EPU-7N (manufactured by Adeka Corporation).

The composition may contain an amine curing agent [C], part of which may be subjected to a preliminary reaction in advance. In some cases, this method can serve effectively for viscosity adjustment and storage stability improvement.

For the epoxy resin composition, it is preferable that the constituents (components) other than the amine curing agent [C] be first heated and kneaded uniformly at a temperature of about 160° C. and cooled to a temperature of about 80° C., followed by adding the amine curing agent [C] and further kneading, although methods to be used to mix the components are not limited to this.

Different types of reinforcement fiber can serve, and they include glass fiber, carbon fiber, graphite fiber, aramid fiber, boron fiber, alumina fiber, and silicon carbide fiber. Two or more of these types of reinforcement fiber may be used in combination, but the use of carbon fiber or graphite fiber is preferred to provide lightweight moldings with high durability. With a high specific modulus and specific strength, carbon fiber is used favorably, particularly when it is necessary to produce lightweight or high-strength materials.

In respect to carbon fiber favorably used, virtually any appropriate type of carbon fiber can be adopted for varied uses, but it is preferable for the carbon fiber to be used to have a tensile modulus not more than 400 GPa from the viewpoint of impact resistance. From the viewpoint of strength, carbon fiber with a tensile strength of 4.4 to 6.5 GPa is preferred because a composite material with high rigidity and high mechanical strength can be produced. Tensile elongation is also an important factor, and it is preferable for the carbon fiber to have a high strength and a high elongation percentage of 1.7% to 2.3%. The most suitable carbon fiber will have various good characteristics simultaneously including a tensile modulus of at least 230 GPa, tensile strength of at least 4.4 GPa, and tensile elongation of at least 1.7%.

Commercially available products of carbon fiber include TORAYCA (registered trademark) T800G-24K, TORAYCA (registered trademark) T800S-24K, TORAYCA (registered trademark) T700G-24K, TORAYCA (registered trademark) T300-3K, and TORAYCA (registered trademark) T700S-12K (all manufactured by Toray Industries, Inc.).

In regard to the form and way of alignment of carbon fibers, long fibers paralleled in one direction, woven fabric, or others may be adopted appropriately, but if a carbon fiber reinforced composite material that is lightweight and relatively highly durable is to be obtained, it is preferable to use carbon fibers in the form of long fibers (fiber bundles) paralleled in one direction, woven fabric, or other continuous fibers.

The prepreg is produced by impregnating the aforementioned reinforcement fiber with the aforementioned epoxy resin composition. In the prepreg, the mass fraction of fiber is preferably 40 to 90 mass %, more preferably 50 to 80 mass %. If the mass fraction of fiber is too small, the resulting composite material will be too heavy and the advantages of fiber reinforced composite material such as high specific strength and specific modulus, will be impaired in some cases, whereas if the mass fraction of fiber is too large, impregnation with the resin composition will not be achieved satisfactorily and the resulting composite material will suffer from many voids, possibly leading to a large deterioration in mechanical characteristics.

There are no specific limitations on the form of the reinforcement fiber, which may be, for example, in the form of long fibers paralleled in one direction, tow, woven fabric, mat, knit, or braid. For applications that require high specific strength and high specific modulus, in particular, the most suitable is a unidirectionally paralleled arrangement of reinforcement fiber, but cloth-like (woven fabric) arrangement is also suitable because of easy handling.

The prepreg can be produced by some different methods including a method in which the epoxy resin composition used as matrix resin is dissolved in a solvent such as methyl ethyl ketone and methanol to produce a solution with a decreased viscosity, and then used to impregnate reinforcement fiber (wet method), and a hot melt method in which the matrix resin is heated to decrease its viscosity and then used to impregnate reinforcement fiber (dry method).

The wet method includes the steps of immersing reinforcement fiber in a solution of an epoxy resin composition, that is, matrix resin, pulling it out, and evaporating the solvent using an oven or the like, whereas the hot melt method (dry method) includes the steps of heating an epoxy resin composition to reduce the viscosity and directly impregnating the reinforcement fiber with it, or the steps of coating release paper or the like with the epoxy resin composition to prepare a film, attaching the film to cover either or both sides of a reinforcement fiber sheet, and pressing them while heating so that the reinforcement fiber is impregnated with the resin. The hot melt method is preferred because the resulting prepreg will be substantially free of residual solvent.

Plies of the resulting prepreg are stacked and the laminate obtained is heated under pressure to cure the matrix resin, thereby providing the fiber reinforced composite material.

Application of heat and pressure is carried out by using an appropriate method such as press molding, autoclave molding, bagging molding, wrapping tape molding, and internal pressure molding.

The fiber reinforced composite material can be produced by a prepreg-free molding method in which reinforcement fiber is directly impregnated with the epoxy resin composition, followed by heating for curing, and examples of such a method include hand lay-up molding, filament winding, pultrusion, resin injection molding, and resin transfer molding. For these methods, it is preferable that two liquids, that is, a base resin formed of epoxy resin containing component [A] and an epoxy resin curing agent containing an amine curing agent used as component [C], are mixed immediately before use to prepare an epoxy resin composition.

Fiber reinforced composite material produced from the epoxy resin composition as matrix resin is used favorably to produce aircraft members, general industrial products, and sporting goods. More specifically, their preferred applications in the aerospace industry include primary structural members of aircraft such as main wing, tail unit, and floor beam; secondary structural members such as flap, aileron, cowl, fairing, and other interior materials; and structural members of artificial satellites such as rocket motor case. Of these aeronautical and aerospace applications, primary structural members of aircraft, including body skin and main wing skin, that particularly require high impact resistance as well as high tensile strength at low temperatures to resist the coldness during high-altitude flights represent particularly suitable applications of the fiber reinforced composite material. Their preferred applications for general industrial uses include structural members of vehicles such as automobiles, ships, and railroad vehicles; and civil engineering and construction materials such as drive shafts, plate springs, windmill blades, various turbines, pressure vessels, flywheels, rollers for paper manufacture, roofing materials, cables, reinforcing bars, and mending/reinforcing materials. Preferred applications in the sporting goods industry include golf shafts, fishing poles, rackets for tennis, badminton, squash and the like, hockey sticks, and skiing poles.

EXAMPLES

The epoxy resin composition is described more specifically below with reference to Examples. Described first below are the resin material preparation procedures and evaluation methods used in Examples. The evaluations carried out in Examples were performed in an atmosphere with a temperature of 25° C.±2° C. and relative humidity of 50% unless otherwise specified.

Epoxy Resin
[A] an epoxy resin as represented by Formula (1) or an epoxy resin as represented by Formula (2)
glycidyl compound of 2,2'-biphenol
Method of production of glycidyl compound of 2,2'-biphenol: based on Japanese Unexamined Patent Application Publication No. SHO 58-140089

In a 1-liter three-neck flask equipped with a thermometer, cooler, and stirrer, 93.1 g (0.5 mole) of 2,2'-biphenol, 462.5 g (5.0 moles) of epichlorohydrin, and 3.9 g (0.025 moles) of tetramethylammonium bromide were fed and subjected to reaction under reflux (117° C.) for 2 hours.

Then, the reaction solution was cooled to 60° C. and a water separator was attached, followed by adding 44.0 g (1.1 moles) of sodium hydroxide and performing cyclization reaction under reduced pressure (150 to 100 mmHg). The resulting water was removed continuously out of the system through azeotropic distillation with epichlorohydrin and the reaction was terminated when the volume of the water formed reached 18 ml.

Unreacted epichlorohydrin was recovered at 0.1 to 50 mmHg and 60 to 110° C., and 1 liter of methyl ethyl ketone was added to the reaction product to produce slurry, which was then rinsed thoroughly with 500 ml of water to remove sodium chloride formed as a by-product.

Methyl ethyl ketone was removed from the rinsed solution of the reaction product by evaporating it under reduced pressure using a rotary evaporator to provide 104.4 g of a light yellow viscous liquid. The resulting resin had an epoxy equivalent of 177.

glycidyl compound of 2,2'-dihydroxydiphenyl methane
Method of production of glycidyl compound of 2,2'-dihydroxydiphenyl methane: based on Japanese Unexamined Patent Publication (Kokai) No. SHO 58-140089

In a 1-liter three-neck flask equipped with a thermometer, cooler, and stirrer, 100.1 g (0.5 mole) of 2,2'-dihydroxydiphenyl methane, 462.5 g (5.0 moles) of epichlorohydrin, and 3.9 g (0.025 moles) of tetramethylammonium bromide were fed and subjected to reaction under reflux (117° C.) for 2 hours.

Then, the reaction solution was cooled to 60° C. and a water separator was attached, followed by adding 44.0 g (1.1 moles) of sodium hydroxide and performing cyclization reaction under reduced pressure (150 to 100 mmHg). The resulting water was removed continuously out of the system through azeotropic distillation with epichlorohydrin and the reaction was terminated when the volume of the water formed reached 18 ml.

Unreacted epichlorohydrin was recovered at 0.1 to 50 mmHg and 60 to 110° C., and 1 liter of methyl ethyl ketone was added to the reaction product to produce slurry, which was then rinsed thoroughly with 500 ml of water to remove sodium chloride formed as a by-product.

Methyl ethyl ketone was removed from the rinsed solution of the reaction product by evaporating it under reduced pressure using a rotary evaporator to provide 109.3 g of a white solid material. The resulting resin had an epoxy equivalent of 169.

glycidyl compound of 2,2'-methylene-bis(4-methylphenol)
Method of production of glycidyl compound of 2,2'-methylene-bis(4-methylphenol): based on Japanese Unexamined Patent Publication (Kokai) No. SHO 58-140089

In a 1-liter three-neck flask equipped with a thermometer, cooler, and stirrer, 114.1 g (0.5 mole) of 2,2'-methylene-bis(4-methylphenol), 462.5 g (5.0 moles) of epichlorohydrin, and 3.9 g (0.025 moles) of tetramethylammonium bromide were fed and subjected to reaction under reflux (117° C.) for 2 hours.

Then, the reaction solution was cooled to 60° C. and a water separator was attached, followed by adding 44.0 g (1.1 moles) of sodium hydroxide and performing cyclization reaction under reduced pressure (150 to 100 mmHg). The resulting water was removed continuously out of the system through azeotropic distillation with epichlorohydrin and the reaction was terminated when the volume of the water formed reached 18 ml.

Unreacted epichlorohydrin was recovered at 0.1 to 50 mmHg and 60 to 110° C., and 1 liter of methyl ethyl ketone was added to the reaction product to produce slurry, which was then rinsed thoroughly with 500 ml of water to remove sodium chloride formed as a by-product.

Methyl ethyl ketone was removed from the rinsed solution of the reaction product by evaporating it under reduced pressure using a rotary evaporator to provide 119.1 g of a white solid material. The resulting resin had an epoxy equivalent of 170.

glycidyl compound of 2,2'-isopropylidene diphenol
Method of production of glycidyl compound of 2,2'-isopropylidene diphenol: based on Japanese Unexamined Patent Publication (Kokai) No. SHO 58-140089

In a 1-liter three-neck flask equipped with a thermometer, cooler, and stirrer, 114.0 g of 2,2'-isopropylidene diphenol, 462.5 g (5.0 moles) of epichlorohydrin, and 3.9 g (0.025 moles) of tetramethylammonium bromide were fed and subjected to reaction under reflux (117° C.) for 2 hours.

Then, the reaction solution was cooled to 60° C. and a water separator was attached, followed by adding 44.0 g (1.1 moles) of sodium hydroxide and performing cyclization reaction under reduced pressure (150 to 100 mmHg). The resulting water was removed continuously out of the system through azeotropic distillation with epichlorohydrin and the reaction was terminated when the volume of the water formed reached 18 ml.

Unreacted epichlorohydrin was recovered at 0.1 to 50 mmHg and 60 to 110° C., and 1 liter of methyl ethyl ketone was added to the reaction product to produce slurry, which was then rinsed thoroughly with 500 ml of water to remove sodium chloride formed as a by-product.

Methyl ethyl ketone was removed from the rinsed solution of the reaction product by evaporating it under reduced pressure using a rotary evaporator to provide 127.5 g of a white solid material. The resulting resin had an epoxy equivalent of 170.

glycidyl compound of 2,2'-thiodiphenol
Method of production of glycidyl compound of 2,2'-thiodiphenol: based on Japanese Unexamined Patent Publication (Kokai) No. SHO 58-140089

In a 1-liter three-neck flask equipped with a thermometer, cooler, and stirrer, 114.0 g (0.5 moles) of 2,2'-thiodiphenol, 462.5 g (5.0 moles) of epichlorohydrin, and 3.9 g (0.025 moles) of tetramethylammonium bromide were fed and subjected to reaction under reflux (117° C.) for 2 hours.

Then, the reaction solution was cooled to 60° C. and a water separator was attached, followed by adding 44.0 g (1.1 moles) of sodium hydroxide and performing cyclization reaction under reduced pressure (150 to 100 mmHg). The resulting water was removed continuously out of the system through azeotropic distillation with epichlorohydrin and the reaction was terminated when the volume of the water formed reached 18 ml.

Unreacted epichlorohydrin was recovered at 0.1 to 50 mmHg and 60 to 110° C., and 1 liter of methyl ethyl ketone was added to the reaction product to produce slurry, which was then rinsed thoroughly with 500 ml of water to remove sodium chloride formed as a by-product.

Methyl ethyl ketone was removed from the rinsed solution of the reaction product by evaporating it under reduced pressure using a rotary evaporator to provide 131.2 g of a white solid material. The resulting resin had an epoxy equivalent of 165.

glycidyl compound of 2,2'-oxydiphenol
Method of production of glycidyl compound of 2,2'-oxydiphenol: based on Japanese Unexamined Patent Publication (Kokai) No. SHO 58-140089

In a 1-liter three-neck flask equipped with a thermometer, cooler, and stirrer, 101.0 g (0.5 moles) of 2,2'-xydiphenol, 462.5 g (5.0 moles) of epichlorohydrin, and 3.9 g (0.025 moles) of tetramethylammonium bromide were fed and subjected to reaction under reflux (117° C.) for 2 hours.

Then, the reaction solution was cooled to 60° C. and a water separator was attached, followed by adding 44.0 g (1.1 moles) of sodium hydroxide and performing cyclization reaction under reduced pressure (150 to 100 mmHg). The resulting water was removed continuously out of the system through azeotropic distillation with epichlorohydrin and the reaction was terminated when the volume of the water formed reached 18 ml.

Unreacted epichlorohydrin was recovered at 0.1 to 50 mmHg and 60 to 110° C., and 1 liter of methyl ethyl ketone was added to the reaction product to produce slurry, which was then rinsed thoroughly with 500 ml of water to remove sodium chloride formed as a by-product.

Methyl ethyl ketone was removed from the rinsed solution of the reaction product by evaporating it under reduced pressure using a rotary evaporator to provide 117.8 g of a white solid material. The resulting resin had an epoxy equivalent of 157.

glycidyl compound of 2-aminophenol
Method of production of glycidyl compound of 2-aminophenol: based on Japanese Unexamined Patent Publication (Kokai) No. SHO 62-74918

In a 2-liter four-necked flask equipped with a stirring device, thermometer, cooler-separator, and dropping funnel, 54.6 g (0.5 moles) of 2-aminophenol and 693.8 g (7.5 moles) of epichlorohydrin were fed, dissolved, and maintained while warming at a 40° C. for 15 hours.

Subsequently, the reaction solution was heated to 65° C., and 130.7 g (1.7 moles) of a 48% aqueous sodium hydroxide solution was dropped over 4 hours at a reduced pressure of 150 mmHg while the water in the system was removed continuously through azeotropic distillation with epichlorohydrin. Then, the excess epichlorohydrin was evaporated at 70° C. and 5 mmHg. After the evaporation of epichlorohydrin, the reaction product was dissolved in 1 liter of methyl ethyl ketone and then rinsed thoroughly with 500 ml of water to remove sodium chloride formed as a by-product.

Methyl ethyl ketone was removed from the rinsed solution of the product by evaporating it under reduced pressure using a rotary evaporator to provide 97.1 g of a transparent viscous liquid. The resulting resin had an epoxy equivalent of 100.

Polyfunctional Amine Type Epoxy Resin [D]

SUMI-EPDXY (registered trademark) ELM434 (tetraglycidyl diaminodiphenyl methane, manufactured by Sumitomo Chemical Co., Ltd.)

Araldite (registered trademark) MY721 (tetraglycidyl diaminodiphenyl methane, manufactured by Huntsman Japan KK)

jER (registered trademark) 630 (triglycidyl-para-aminophenol, manufactured by Mitsubishi Chemical Corporation)

Araldite (registered trademark) MY0600 (triglycidyl-m-aminophenol, manufactured by Huntsman Japan KK)

triglycidyl-4-amino-m-cresol

From 4-amino-m-cresol as starting material, synthesis was carried out by the same procedure as for N,N-diglycidyl-2-(glycidyloxy) aniline.

Epoxy Resin [F] Having a Bisphenol Backbone

AER4152 (urethane-modified epoxy resin, manufactured by Asahi Kasei E-materials Corporation, epoxy equivalent 340)

jER (registered trademark) 4004P (bisphenol F type epoxy resin, manufactured by Mitsubishi Chemical Corporation, epoxy equivalent 800)

jER (registered trademark) 1007 (bisphenol A type epoxy resin, manufactured by Mitsubishi Chemical Corporation, epoxy equivalent 1975)

Epoxy Resins Other than [A], [D], and [F]

EPOTOHTO (registered trademark) YD-128 (bisphenol A type epoxy resin, manufactured by Nippon Steel Chemical Co., Ltd., epoxy equivalent 189)

EPICLON (registered trademark) 830 (bisphenol F type epoxy resin, manufactured by DIC Corporation, epoxy equivalent 170)

jER (registered trademark) YX4000 (biphenyl type epoxy resin, manufactured by Mitsubishi Chemical Corporation, epoxy equivalent 186)

RE-6025 (bisphenol F type epoxy resin, manufactured by Nippon Kayaku Co., Ltd., epoxy equivalent 165)

EPICLON (registered trademark) EXA1517 (bisphenol S type epoxy resin, manufactured by DIC Corporation, epoxy equivalent 165)

SUMI-EPDXY (registered trademark) ESCN-195XF (orthocresol type epoxy resin, manufactured by Sumitomo Chemical Co., Ltd., epoxy equivalent 190)

[B] at least one component selected from the group consisting of thermoplastic resins that is compatible with the epoxy resin [A], and core-shell polymers SUMIKAXCEL (registered trademark) PES5003P (polyethersulfone, Tg 225° C., manufactured by Sumitomo Chemical Co., Ltd.)

Virantage (registered trademark) VW-30500RP (polysulfone, Tg 190° C., manufactured by Solvay Speciality Polymers)

Vinylec (registered trademark) PVF-K (polyvinyl formal, Tg 140° C., manufactured by JNC Corporation)

Kane Ace (registered trademark) MX 416 (manufactured by Kaneka Corporation) (master batch of 75 parts by mass of Araldite MY721 and 25 parts by mass of core-shell polymer particles (average particle diameter 100 nm, core: crosslinked polybutadiene, shell: PMMA/glycidylmethacrylate/styrene copolymer))

Amine Curing Agent [C]

Seikacure S (4,4'-diaminodiphenyl sulfone, manufactured by Wakayama Seika Kogyo Co., Ltd.)

3,3'-DAS (3,3'-diaminodiphenyl sulfone, manufactured by Mitsui Fine Chemical, Inc.)

Lonzacure (registered trademark) M-MIPA (3,3'-diisopropyl-5,5'-dimethyl-4,4'-diaminodiphenyl methane, manufactured by Lonza Japan)

DICY7 (dicyandiamide, manufactured by Mitsubishi Chemical Corporation)

Curing Agent Other than Amine Curing Agent [C]

methyl tetrahydrophthalic anhydride (manufactured by Wako Pure Chemical Industries, Ltd.)

PHENOLITE (registered trademark) TD-2131 (novolac type phenol resin, manufactured by DIC Corporation)

Thermoplastic Resin Particles [E] Insoluble in Epoxy Resin [A]

Grilamid (registered trademark) TR-55 particles (prepared from Grilamid (registered trademark) TR55 as material, particles with an average particle diameter of 13 μm)

Preparation Method for Grilamid (Registered Trademark) TR-55 Particles

First, 33 g of a transparent polyamide product (trade name: Grilamid (registered trademark) TR55, manufactured by Emser Werke, Inc.) was added to a mixed solvent composed of 100 g of chloroform and 35 g of methanol to provide a uniform solution. Then, using a spray gun designed for painting, the resulting solution was sprayed strongly against the liquid surface of 1,000 g of well-stirred n-hexane to separate out the solute. The precipitated solid was separated by filtration, washed well with n-hexane, and vacuum-dried at a temperature of 100° C. for 24 hours to provide 28 g of a white solid material. The resulting powder was observed by scanning electron microscopy and found to contain particles of Grilamid (registered trademark) TR-55 with an average particle diameter of 13 μm.

Orgasol (registered trademark) 1002D (manufactured by Arkema, average particle diameter 21.0 μm)

Other Components

DCMU99 (3-(3,4-dichlorophenyl)-1,1-dimethylurea, curing accelerator, manufactured by Hodogaya Chemical Co., Ltd.)

benzyldimethyl amine (manufactured by Tokyo Chemical Industry Co., Ltd.)

(1) Preparation of Epoxy Resin Composition

In a kneader, specified quantities of an epoxy resin as represented by Formula (1) or an epoxy resin as represented by Formula (2), which is referred to as epoxy resin [A], or a polyfunctional amine type epoxy [D], an epoxy resin [F] having a bisphenol backbone, an epoxy resin other than [A], [D], and [F], and at least one selected from the group consisting of thermoplastic resins that is compatible with the epoxy resin [A], and core-shell polymers, which is referred to as component [B], were fed and heated up to 160° C. while kneading, and then kneaded at 160° C. for 1 hour to provide a transparent viscous liquid. After cooling to 80° C. while kneading, specified quantities of an amine curing agent [C], a curing agent other than the amine curing agent [C], thermoplastic resin particles [E] insoluble in the epoxy resin [A], and other components other than the epoxy resins were added and kneaded further to provide an epoxy resin composition.

(2) Measurement of Flexural Modulus of Cured Epoxy Resin

The epoxy resin composition prepared in section (1) above was deaerated in a vacuum and injected in a mold that was set up so that the thickness would be 2 mm by a 2 mm thick Teflon (registered trademark) spacer. Curing was performed at a temperature of 180° C. for 2 hours to provide a cured epoxy resin with a thickness of 2 mm. Then, the resulting cured epoxy resin plate was cut to prepare a test piece with a width of 10 mm and length of 60 mm, and it was subjected to three-point bending test with a span of 32 mm, followed by measuring the flexural modulus according to JIS K7171-1994.

(3) Nominal Compressive Strain at Break of Cured Epoxy Resin

The epoxy resin composition prepared in section (1) above was deaerated in a vacuum and injected in a mold that was set up so that the thickness would be 6 mm by a 6 mm thick Teflon (registered trademark) spacer, followed by curing at a temperature of 180° C. for 2 hours to provide a cured epoxy resin with a thickness of 6 mm. This cured epoxy resin was cut to prepare a test piece with a size of 6×6 mm. A plate of cured epoxy resin with a thickness of 6 mm was prepared using an Instron type universal tester (manufactured by Instron Corporation). Then, a cubic specimen 6 mm on each side was cut out of the cured epoxy resin plate and subjected to measurement of the nominal compressive strain at break under the same conditions as specified in JIS K7181 except for a test speed of 1±0.2 mm/min.

Example 1

In a kneader, 45 parts by mass of 2,2'-diglycidyloxy biphenyl (as epoxy resin [A] represented by Formula (1)) and 55 parts by mass of jER (registered trademark) 630 (as polyfunctional amine type epoxy resin [D]) were kneaded, and then 17 parts by mass of SUMIKAXCEL (registered trademark) PES5003P (as component [B], which is at least one selected from the group consisting of thermoplastic resins compatible with the epoxy resin [A], and core-shell polymers) was dissolved and kneaded at 160° C., followed by cooling the epoxy resin composition to 80° C. and kneading with 51 parts by mass of 3,3'-DAS (as amine curing agent [C]) to provide an epoxy resin composition. Table 1 lists the components and proportions (figures in Table 1 are in parts by mass). The resulting epoxy resin composition was subjected to the measurement of flexural modulus of cured epoxy resin described in paragraph (2) above and the measurement of nominal compressive strain at break of cured epoxy resin described in paragraph (3). Results are given in Table 1.

Examples 2 to 9 and 12 to 29, and Comparative Examples 1 to 19

Except that an epoxy resin as represented by Formula (1) or an epoxy resin as represented by Formula (2), which is referred to as epoxy resin [A], a polyfunctional amine type epoxy resin [D], an epoxy resin [F], an epoxy resin other than [A], [D], and [F], at least one selected from the group consisting of thermoplastic resins compatible with the epoxy resin [A], and core-shell polymers, which is referred to as component [B], an amine curing agent [C], and other components were fed in the quantities specified in Table 1, the same procedure as in Example 1 was carried out to provide an epoxy resin composition. The resulting epoxy resin composition was subjected to the measurement of flexural modulus of cured epoxy resin described in paragraph (2) above and the measurement of nominal compressive strain at break of cured epoxy resin described in paragraph (3). Results obtained in Examples 2 to 9, Examples 12-29, and Comparative Examples 1 to 19 are shown in Table 1.

Example 10

In a kneader, 30 parts by mass of 2,2'-methylene-bis(1-glycidyloxy benzene) (as epoxy resin [A] represented by Formula (1)), 60 parts by mass of jER (registered trademark) 630 (as polyfunctional amine type epoxy resin [D]), and 10 parts by mass of EPICLON (registered trademark) 830 (as epoxy resin other than [A], [D], and [F]) were kneaded, and then 17 parts by mass of SUMIKAXCEL (registered trademark) PES5003P (as component [B] which is at least one selected from the group consisting of thermoplastic resins compatible with the epoxy resin [A], and core-shell polymers) were dissolved and kneaded at 160° C., followed by cooling the epoxy resin composition to 80° C. and kneading with 47 parts by mass of 3,3'-DAS (as amine curing agent [C]) and 26 parts by mass of Grilamid (registered trademark) TR-55 particles (as thermoplastic resin particles [E]) to provide an epoxy resin composition. Table 1 lists the components and proportions. The resulting epoxy resin composition was subjected to the measurement of flexural modulus of cured epoxy resin described in paragraph (2) above and the measurement of nominal compressive strain at break of cured epoxy resin described in paragraph (3). Results are given in Table 1.

Example 11

Except that an epoxy resin as represented by Formula (1), which is referred to as epoxy resin [A], a polyfunctional amine type epoxy resin [D], an epoxy resin other than [A], [D], and [F], at least one selected from the group consisting of thermoplastic resins compatible with the epoxy resin [A], and core-shell polymers, which is referred to as component [B], an amine curing agent [C], and thermoplastic resin particles [E] were fed in the quantities specified in Table 1, the same procedure as in Example 10 was carried out to provide an epoxy resin composition. The resulting epoxy resin composition was subjected to the measurement of flexural modulus of cured epoxy resin described in paragraph (2) above and the measurement of nominal compressive strain at break of cured epoxy resin described in paragraph (3). Results are given in Table 1.

TABLE 1

|  | Example 1 | Example 2 | Example 3 | Example 4 | Example 5 |
|---|---|---|---|---|---|
| Epoxy resin | | | | | |
| ([A] epoxy resin as represented by Formula (1)) | | | | | |
| glycidyl compound of 2,2'-biphenol | 45 | | | | |
| glycidyl compound of 2,2'-dihydroxydiphenyl methane | | 45 | | | |
| glycidyl compound of 2,2'-methylene-bis(4-methyl phenol) | | | 45 | | |
| glycidyl compound of 2,2'-isopropylidene diphenol | | | | 45 | |
| glycidyl compound of 2,2'-thiodiphenol | | | | | 45 |
| glycidyl compound of 2,2'-oxydiphenol | | | | | |
| ([A] an epoxy resin as represented by Formula (2)) | | | | | |
| glycidyl compound of 2-aminophenol | | | | | |
| ([D] polyfunctional amine type epoxy resin) | | | | | |
| SUMI-EPOXY ® ELM434 | | | | | |
| Araldite ® MY721 | | | | | |

TABLE 1-continued

|  |  |  |  |  |  |
|---|---|---|---|---|---|
| jER ® 630 | 55 | 55 | 55 | 55 | 55 |
| Araldite ® MY0600 |  |  |  |  |  |
| triglycidyl-4-amino-m-cresol |  |  |  |  |  |
| ([F] epoxy resin having bisphenol backbone) |  |  |  |  |  |
| AER4152 |  |  |  |  |  |
| jER ® 4004P |  |  |  |  |  |
| jER ® 1007 |  |  |  |  |  |
| (Epoxy resin other than [A], [D], and [F]) |  |  |  |  |  |
| EPOTOHTO ® YD-128 |  |  |  |  |  |
| EPICLON ® 830 |  |  |  |  |  |
| jER ® YX4000 |  |  |  |  |  |
| RE-602S |  |  |  |  |  |
| EPICLON ® EXA1517 |  |  |  |  |  |
| SUMI-EPOXY ® ESCN-195XF |  |  |  |  |  |
| [B] at least one selected from the group consisting of thermoplastic resins that is compatible with the epoxy resin [A], and core-shell polymers |  |  |  |  |  |
| SUMIKAXCEL ® PES5003P | 17 | 17 | 17 | 17 | 17 |
| Virantage ® VW-30500RP |  |  |  |  |  |
| Vinylec ® K |  |  |  |  |  |
| Kane Ace MX416 |  |  |  |  |  |
| [C] amine curing agent |  |  |  |  |  |
| Seikacure S |  |  |  |  |  |
| 3,3'-DAS | 51 | 51 | 51 | 51 | 52 |
| Lonzacure M-MIPA |  |  |  |  |  |
| DICY7 |  |  |  |  |  |
| Curing agent other than amine curing agent [C] |  |  |  |  |  |
| methyl tetrahydrophthalic anhydride |  |  |  |  |  |
| PHENOLITE ® TD-2131 |  |  |  |  |  |
| [E] thermoplastic resin particles insoluble in epoxy resin [A] |  |  |  |  |  |
| Grilamid ® TR-55 particles |  |  |  |  |  |
| Orgasol ® 1002D |  |  |  |  |  |
| Other components |  |  |  |  |  |
| DCMU99 |  |  |  |  |  |
| benzyl dimethyl amine |  |  |  |  |  |
| Characteristics of cured epoxy resin |  |  |  |  |  |
| flexural modulus (GPa) | 4.4 | 4.2 | 4.1 | 4.3 | 4.0 |
| nominal compressive strain at break (%) | 56 | 54 | 53 | 53 | 50 |

|  | Example 6 | Example 7 | Example 8 | Example 9 | Example 10 |
|---|---|---|---|---|---|
| Epoxy resin |  |  |  |  |  |
| ([A] epoxy resin as represented by Formula (1)) |  |  |  |  |  |
| glycidyl compound of 2,2'-biphenol |  | 60 |  |  | 30 |
| glycidyl compound of 2,2'-dihydroxydiphenyl methane |  |  | 70 |  |  |
| glycidyl compound of 2,2'-methylene-bis(4-methyl phenol) |  |  |  | 15 |  |
| glycidyl compound of 2,2'-isopropylidene diphenol |  |  |  |  |  |
| glycidyl compound of 2,2'-thiodiphenol |  |  |  |  |  |
| glycidyl compound of 2,2'-oxydiphenol | 45 |  |  |  |  |
| ([A] an epoxy resin as represented by Formula (2)) |  |  |  |  |  |
| glycidyl compound of 2-aminophenol |  |  |  |  |  |
| ([D] polyfunctional amine type epoxy resin) |  |  |  |  |  |
| SUMI-EPOXY ® ELM434 |  |  | 20 |  |  |
| Araldite ® MY721 |  |  |  |  |  |
| jER ® 630 | 55 | 30 |  |  | 60 |
| Araldite ® MY0600 |  |  |  | 75 |  |
| triglycidyl-4-amino-m-cresol |  |  |  |  |  |
| ([F] epoxy resin having bisphenol backbone) |  |  |  |  |  |
| AER4152 |  |  |  |  |  |
| jER ® 4004P |  |  |  |  |  |
| jER ® 1007 |  |  |  |  |  |
| (Epoxy resin other than [A], [D], and [F]) |  |  |  |  |  |
| EPOTOHTO ® YD-128 |  |  |  |  |  |
| EPICLON ® 830 |  |  | 10 | 10 | 10 |
| jER ® YX4000 |  | 10 |  |  |  |
| RE-602S |  |  |  |  |  |
| EPICLON ® EXA1517 |  |  |  |  |  |

TABLE 1-continued

|  |  |  |  |  |  |
| --- | --- | --- | --- | --- | --- |
| SUMI-EPOXY ® ESCN-195XF |  |  |  |  |  |
| [B] at least one selected from the group consisting of thermoplastic resins that is compatible with the epoxy resin [A], and core-shell polymers |  |  |  |  |  |
| SUMIKAXCEL ® PES5003P | 17 |  | 17 | 18 | 17 |
| Virantage ® VW-30500RP |  | 32 |  |  |  |
| Vinylec ® K |  |  |  |  |  |
| Kane Ace MX416 |  |  |  |  |  |
| [C] amine curing agent |  |  |  |  |  |
| Seikacure S |  |  |  |  |  |
| 3,3'-DAS | 53 | 43 | 40 | 49 | 47 |
| Lonzacure M-MIPA |  |  |  |  |  |
| DICY7 |  |  |  |  |  |
| Curing agent other than amine curing agent [C] |  |  |  |  |  |
| methyl tetrahydrophthalic anhydride |  |  |  |  |  |
| PHENOLITE ® TD-2131 |  |  |  |  |  |
| [E] thermoplastic resin particles insoluble in epoxy resin [A] |  |  |  |  |  |
| Grilamid ® TR-55 particles |  |  |  |  | 26 |
| Orgasol ® 1002D |  |  |  |  |  |
| Other components |  |  |  |  |  |
| DCMU99 |  |  |  |  |  |
| benzyl dimethyl amine |  |  |  |  |  |
| Characteristics of cured epoxy resin |  |  |  |  |  |
| flexural modulus (GPa) | 4.1 | 4.3 | 4.4 | 4.0 | 4.0 |
| nominal compressive strain at break (%) | 51 | 51 | 52 | 50 | 57 |

|  | Example 11 | Example 12 | Example 13 | Example 14 | Example 15 |
| --- | --- | --- | --- | --- | --- |
| Epoxy resin |  |  |  |  |  |
| ([A] epoxy resin as represented by Formula (1)) |  |  |  |  |  |
| glycidyl compound of 2,2'-biphenol |  |  |  |  |  |
| glycidyl compound of 2,2'-dihydroxydiphenyl methane | 40 |  |  |  |  |
| glycidyl compound of 2,2'-methylene-bis(4-methyl phenol) |  |  |  |  |  |
| glycidyl compound of 2,2'-isopropylidene diphenol |  |  |  |  |  |
| glycidyl compound of 2,2'-thiodiphenol |  |  |  |  |  |
| glycidyl compound of 2,2'-oxydiphenol |  |  |  |  |  |
| ([A] an epoxy resin as represented by Formula (2)) |  |  |  |  |  |
| glycidyl compound of 2-aminophenol |  | 10 | 20 | 5 | 30 |
| ([D] polyfunctional amine type epoxy resin) |  |  |  |  |  |
| SUMI-EPOXY ® ELM434 |  |  |  |  | 50 |
| Araldite ® MY721 |  |  |  |  |  |
| jER ® 630 | 30 |  |  |  |  |
| Araldite ® MY0600 |  | 40 | 50 |  |  |
| triglycidyl-4-amino-m-cresol |  |  |  | 70 |  |
| ([F] epoxy resin having bisphenol backbone) |  |  |  |  |  |
| AER4152 |  |  |  |  |  |
| jER ® 4004P |  |  |  |  |  |
| jER ® 1007 |  |  |  |  |  |
| (Epoxy resin other than [A], [D], and [F]) |  |  |  |  |  |
| EPOTOHTO ® YD-128 | 30 |  | 30 | 25 |  |
| EPICLON ® 830 |  | 50 |  |  | 20 |
| jER ® YX4000 |  |  |  |  |  |
| RE-602S |  |  |  |  |  |
| EPICLON ® EXA1517 |  |  |  |  |  |
| SUMI-EPOXY ® ESCN-195XF |  |  |  |  |  |
| [B] at least one selected from the group consisting of thermoplastic resins that is compatible with the epoxy resin [A], and core-shell polymers |  |  |  |  |  |
| SUMIKAXCEL ® PES5003P | 10 | 12 | 20 | 20 | 8 |
| Virantage ® VW-30500RP |  |  |  |  |  |
| Vinylec ® K |  |  |  |  |  |
| Kane Ace MX416 |  |  |  |  |  |
| [C] amine curing agent |  |  |  |  |  |
| Seikacure S | 48 |  |  |  |  |
| 3,3'-DAS |  | 44 | 47 | 62 | 52 |
| Lonzacure M-MIPA |  |  |  |  |  |
| DICY7 |  |  |  |  |  |

TABLE 1-continued

| Curing agent other than amine curing agent [C] | | | | | |
|---|---|---|---|---|---|
| methyl tetrahydrophthalic anhydride | | | | | |
| PHENOLITE ® TD-2131 | | | | | |
| [E] thermoplastic resin particles insoluble in epoxy resin [A] | | | | | |
| Grilamid ® TR-55 particles | | | | | |
| Orgasol ® 1002D | 29 | | | | |
| Other components | | | | | |
| DCMU99 | | | | | |
| benzyl dimethyl amine | | | | | |
| Characteristics of cured epoxy resin | | | | | |
| flexural modulus (GPa) | 4.1 | 4.1 | 4.2 | 3.9 | 4.3 |
| nominal compressive strain at break (%) | 55 | 52 | 53 | 51 | 50 |

| | Example 16 | Example 17 | Example 18 | Example 19 | Example 20 |
|---|---|---|---|---|---|
| Epoxy resin ([A] epoxy resin as represented by Formula (1)) | | | | | |
| glycidyl compound of 2,2'-biphenol | 50 | 50 | 50 | 50 | |
| glycidyl compound of 2,2'-dihydroxydiphenyl methane | | | | | |
| glycidyl compound of 2,2'-methylene-bis(4-methyl phenol) | | | | | |
| glycidyl compound of 2,2'-isopropylidene diphenol | | | | | 50 |
| glycidyl compound of 2,2'-thiodiphenol | | | | | |
| glycidyl compound of 2,2'-oxydiphenol | | | | | |
| ([A] an epoxy resin as represented by Formula (2)) | | | | | |
| glycidyl compound of 2-aminophenol | | | | | |
| ([D] polyfunctional amine type epoxy resin) | | | | | |
| SUMI-EPOXY ® ELM434 | | | | | |
| Araldite ® MY721 | 50 | 35 | 50 | 35 | 50 |
| jER ® 630 | | | | | |
| Araldite ® MY0600 | | | | | |
| triglycidyl-4-amino-m-cresol | | | | | |
| ([F] epoxy resin having bisphenol backbone) | | | | | |
| AER4152 | | | | | |
| jER ® 4004P | | | | | |
| jER ® 1007 | | | | | |
| (Epoxy resin other than [A], [D], and [F]) | | | | | |
| EPOTOHTO ® YD-128 | | | | | |
| EPICLON ® 830 | | | | | |
| jER ® YX4000 | | | | | |
| RE-602S | | | | | |
| EPICLON ® EXA1517 | | | | | |
| SUMI-EPOXY ® ESCN-195XF | | | | | |
| [B] at least one selected from the group consisting of thermoplastic resins that is compatible with the epoxy resin [A], and core-shell polymers | | | | | |
| SUMIKAXCEL ® PES5003P | 17 | | 19 | | 17 |
| Virantage ® VW-30500RP | | | | | |
| Vinylec ® K | | | | | |
| Kane Ace MX416 | | 20 | | 20 | |
| [C] amine curing agent | | | | | |
| Seikacure S | 47 | 47 | | | 47 |
| 3,3'-DAS | | | | | |
| Lonzacure M-MIPA | | | 69 | 69 | |
| DICY7 | | | | | |
| Curing agent other than amine curing agent [C] | | | | | |
| methyl tetrahydrophthalic anhydride | | | | | |
| PHENOLITE ® TD-2131 | | | | | |
| [E] thermoplastic resin particles insoluble in epoxy resin [A] | | | | | |
| Grilamid ® TR-55 particles | | | | | |
| Orgasol ® 1002D | | | | | |
| Other components | | | | | |
| DCMU99 | | | | | |
| benzyl dimethyl amine | | | | | |

TABLE 1-continued

| Characteristics of cured epoxy resin | | | | | |
|---|---|---|---|---|---|
| flexural modulus (GPa) | 4.2 | 4.0 | 4.1 | 4.0 | 4.1 |
| nominal compressive strain at break (%) | 53 | 52 | 55 | 53 | 50 |

| | Example 21 | Example 22 | Example 23 |
|---|---|---|---|
| Epoxy resin | | | |
| ([A] epoxy resin as represented by Formula (1)) | | | |
| glycidyl compound of 2,2'-biphenol | | | |
| glycidyl compound of 2,2'-dihydroxydiphenyl methane | | | |
| glycidyl compound of 2,2'-methylene-bis(4-methyl phenol) | | | |
| glycidyl compound of 2,2'-isopropylidene diphenol | 50 | | |
| glycidyl compound of 2,2'-thiodiphenol | | | |
| glycidyl compound of 2,2'-oxydiphenol | | | |
| ([A] an epoxy resin as represented by Formula (2)) | | | |
| glycidyl compound of 2-aminophenol | | 25 | 25 |
| ([D] polyfunctional amine type epoxy resin) | | | |
| SUMI-EPOXY ® ELM434 | | | |
| Araldite ® MY721 | 35 | 35 | 20 |
| jER ® 630 | | | |
| Araldite ® MY0600 | | | |
| triglycidyl-4-amino-m-cresol | | | |
| ([F] epoxy resin having bisphenol backbone) | | | |
| AER4152 | | | |
| jER ® 4004P | | | |
| jER ® 1007 | | | |
| (Epoxy resin other than [A], [D], and [F]) | | | |
| EPOTOHTO ® YD-128 | | | |
| EPICLON ® 830 | | 40 | 40 |
| jER ® YX4000 | | | |
| RE-602S | | | |
| EPICLON ® EXA1517 | | | |
| SUMI-EPOXY ® ESCN-195XF | | | |
| [B] at least one selected from the group consisting of thermoplastic resins that is compatible with the epoxy resin [A], and core-shell polymers | | | |
| SUMIKAXCEL ® PES5003P | | 17 | |
| Virantage ® VW-30500RP | | | |
| Vinylec ® K | | | |
| Kane Ace MX416 | 20 | | 20 |
| [C] amine curing agent | | | |
| Seikacure S | 47 | 47 | 47 |
| 3,3'-DAS | | | |
| Lonzacure M-MIPA | | | |
| DICY7 | | | |
| Curing agent other than amine curing agent [C] | | | |
| methyl tetrahydrophthalic anhydride | | | |
| PHENOLITE ® TD-2131 | | | |
| [E] thermoplastic resin particles insoluble in epoxy resin [A] | | | |
| Grilamid ® TR-55 particles | | | |
| Orgasol ® 1002D | | | |
| Other components | | | |
| DCMU99 | | | |
| benzyl dimethyl amine | | | |
| Characteristics of cured epoxy resin | | | |
| flexural modulus (GPa) | 4.0 | 4.1 | 4.0 |
| nominal compressive strain at break (%) | 49 | 53 | 51 |

| | Example 24 | Example 25 | Example 26 | Example 27 | Example 28 |
|---|---|---|---|---|---|
| Epoxy resin | | | | | |
| ([A] epoxy resin as represented by Formula (1)) | | | | | |
| glycidyl compound of 2,2'-biphenol | 50 | 20 | | | |
| glycidyl compound of 2,2'-dihydroxydiphenyl methane | | | 40 | 70 | |
| glycidyl compound of 2,2'-methylene-bis(4-methyl phenol) | | | | | |

TABLE 1-continued

| | | | | | |
|---|---|---|---|---|---|
| glycidyl compound of 2,2'-isopropylidene diphenol | | | | | |
| glycidyl compound of 2,2'-thiodiphenol | | | | | |
| glycidyl compound of 2,2'-oxydiphenol | | | | | |
| ([A] an epoxy resin as represented by Formula (2)) | | | | | |
| glycidyl compound of 2-aminophenol | | | | | 20 |
| ([D] polyfunctional amine type epoxy resin) | | | | | |
| SUMI-EPOXY ® ELM434 | | | | | |
| Araldite ® MY721 | | | | | |
| jER ® 630 | | | | | |
| Araldite ® MY0600 | | | | | |
| triglycidyl-4-amino-m-cresol | | | | | |
| ([F] epoxy resin having bisphenol backbone) | | | | | |
| AER4152 | | | | | 30 |
| jER ® 4004P | 20 | 20 | 30 | | 30 |
| jER ® 1007 | | | | 30 | |
| (Epoxy resin other than [A], [D], and [F]) | | | | | |
| EPOTOHTO ® YD-128 | | | | | |
| EPICLON ® 830 | 30 | 60 | 30 | | 20 |
| jER ® YX4000 | | | | | |
| RE-602S | | | | | |
| EPICLON ® EXA1517 | | | | | |
| SUMI-EPOXY ® ESCN-195XF | | | | | |
| [B] at least one selected from the group consisting of thermoplastic resins that is compatible with the epoxy resin [A], and core-shell polymers | | | | | |
| SUMIKAXCEL ® PES5003P | | | | | |
| Virantage ® VW-30500RP | | | | | |
| Vinylec ® K | 7 | 7 | 7 | 7 | 5 |
| Kane Ace MX416 | | | | | |
| [C] amine curing agent | | | | | |
| Seikacure S | | | | | |
| 3,3'-DAS | | | | | |
| Lonzacure M-MIPA | | | | | |
| DICY7 | 5.3 | 5.9 | 5.4 | 6 | 5 |
| Curing agent other than amine curing agent [C] | | | | | |
| methyl tetrahydrophthalic anhydride | | | | | |
| PHENOLITE ® TD-2131 | | | | | |
| [E] thermoplastic resin particles insoluble in epoxy resin [A] | | | | | |
| Grilamid ® TR-55 particles | | | | | |
| Orgasol ® 1002D | | | | | |
| Other components | | | | | |
| DCMU99 | 3 | 3 | 3 | 3 | 3 |
| benzyl dimethyl amine | | | | | |
| Characteristics of cured epoxy resin | | | | | |
| flexural modulus (GPa) | 4.3 | 3.9 | 4.1 | 4.2 | 4.2 |
| nominal compressive strain at break (%) | 58 | 59 | 57 | 58 | 57 |

| | Example 29 |
|---|---|
| Epoxy resin | |
| ([A] epoxy resin as represented by Formula (1)) | |
| glycidyl compound of 2,2'-biphenol | 50 |
| glycidyl compound of 2,2'-dihydroxydiphenyl methane | |
| glycidyl compound of 2,2'-methylene-bis(4-methyl phenol) | |
| glycidyl compound of 2,2'-isopropylidene diphenol | |
| glycidyl compound of 2,2'-thiodiphenol | |
| glycidyl compound of 2,2'-oxydiphenol | |
| ([A] an epoxy resin as represented by Formula (2)) | |
| glycidyl compound of 2-aminophenol | |
| ([D] polyfunctional amine type epoxy resin) | |
| SUMI-EPOXY ® ELM434 | |
| Araldite ® MY721 | 50 |
| jER ® 630 | |
| Araldite ® MY0600 | |
| triglycidyl-4-amino-m-cresol | |

TABLE 1-continued ([F] epoxy resin having bisphenol backbone)

AER4152
jER ® 4004P
jER ® 1007
(Epoxy resin other than [A], [D], and [F])

EPOTOHTO ® YD-128
EPICLON ® 830
jER ® YX4000
RE-602S
EPICLON ® EXA1517
SUMI-EPOXY ®ESCN-195XF
[B] at least one selected from the group consisting of thermoplastic
resins that is compatible with the epoxy resin [A], and core-shell polymers SUMIKAXCEL ® PES5003P
Virantage ® VW-30500RP
Vinylec ® K                                                                 7
Kane Ace MX416
[C] amine curing agent Seikacure S
3,3'-DAS
Lonzacure M-MIPA
DICY7                                                                       9
Curing agent other than amine curing agent [C]

methyltetrahydrophthalic anhydride
PHENOLITE ® TD-2131
[E] thermoplastic resin particles insoluble in epoxy resin [A]

Grilamid ® TR-55 particles
Orgasol ® 1002D
Other components

DCMU99                                                                      3
benzyl dimethyl amine
Characteristics of cured epoxy resin flexural modulus (GPa)                                                     4.2
nominal compressive strain at break (%)                                     50

| | Comparative Example 1 | Comparative Example 2 | Comparative Example 3 | Comparative Example 4 | Comparative Example 5 |
|---|---|---|---|---|---|
| Epoxy resin | | | | | |
| ([A] epoxy resin as represented by Formula (1)) | | | | | |
| glycidyl compound of 2,2'-biphenol | | | | | |
| glycidyl compound of 2,2'-dihydroxy-diphenyl methane | | | | | |
| glycidyl compound of 2,2'-methylene-bis(4-methyl phenol) | | | | | |
| glycidyl compound of 2,2'-isopropylidene diphenol | | | | | |
| glycidyl compound of 2,2'-thiodiphenol | | | | | |
| glycidyl compound of 2,2'-oxydiphenol | | | | | |
| ([A] an epoxy resin as represented by Formula (2)) | | | | | |
| glycidyl compound of 2-aminophenol | | | | | |
| ([D] polyfunctional amine type epoxy resin) | | | | | |
| SUMI-EPOXY ® ELM434 | | | | | |
| Araldite ® MY721 | | | | | |
| jER ® 630 | 55 | 55 | | 20 | |
| Araldite ® MY0600 | | | 50 | 40 | |
| triglycidyl-4-amino-m-cresol | | | | | 100 |
| ([F] epoxy resin having bisphenol backbone) | | | | | |
| AER4152 | | | | | |
| jER ® 4004P | | | | | |
| jER ® 1007 | | | | | |
| (Epoxy resin other than [A], [D], and [F]) | | | | | |
| EPOTOHTO ® YD-128 | | | | 40 | |
| EPICLON ® 830 | | | 50 | | |
| jER ® YX4000 | 45 | | | | |
| RE-602S | | 45 | | | |
| EPICLON ® EXA1517 | | | | | |
| SUMI-EPOXY ® ESCN-195XF | | | | | |

TABLE 1-continued

| | | | | | |
|---|---|---|---|---|---|
| [B] at least one selected from the group consisting of thermoplastic resins that is compatible with the epoxy resin [A], and core-shell polymers | | | | | |
| SUMIKAXCEL ® PES5003P | 17 | 17 | | 24 | |
| Virantage ® VW-30500RP | | | 60 | | 40 |
| Vinylec ® K | | | | | |
| Kane Ace MX416 | | | | | |
| [C] amine curing agent | | | | | |
| Seikacure S | | | | | 50 |
| 3,3'-DAS | 50 | 52 | 47 | 47 | |
| Lonzacure M-MIPA | | | | | |
| DICY7 | | | | | |
| Curing agent other than amine curing agent [C] | | | | | |
| methyltetrahydrophthalic anhydride | | | | | |
| PHENOLITE ® TD-2131 | | | | | |
| [E] thermoplastic resin particles insoluble in epoxy resin [A] | | | | | |
| Grilamid ® TR-55 particles | | | | | |
| Orgasol ® 1002D | | | | | |
| Other components | | | | | |
| DCMU99 | | | | | |
| benzyl dimethyl amine | | | | | |
| Characteristics of cured epoxy resin | | | | | |
| flexural modulus (GPa) | 3.6 | 3.4 | 3.8 | 3.6 | 3.4 |
| nominal compressive strain at break (%) | 42 | 43 | 45 | 43 | 41 |

| | Comparative Example 6 | Comparative Example 7 | Comparative Example 8 | Comparative Example 9 | Comparative Example 10 |
|---|---|---|---|---|---|
| Epoxy resin ([A] epoxy resin as represented by Formula (1)) | | | | | |
| glycidyl compound of 2,2'-biphenol | | | 4 | 50 | |
| glycidyl compound of 2,2'-dihydroxydiphenyl methane | | | | | |
| glycidyl compound of 2,2'-methylene-bis(4-methyl phenol) | | 15 | | | |
| glycidyl compound of 2,2'-isopropylidene diphenol | | | | | |
| glycidyl compound of 2,2'-thiodiphenol | | | | | |
| glycidyl compound of 2,2'-oxydiphenol | | | | | |
| ([A] an epoxy resin as represented by Formula (2)) | | | | | |
| glycidyl compound of 2-aminophenol | | | | | |
| ([D] polyfunctional amine type epoxy resin) | | | | | |
| SUMI-EPOXY ® ELM434 | | | | | |
| Araldite ® MY721 | | | | | |
| jER ® 630 | | | | | |
| Araldite ® MY0600 | | 75 | | | |
| triglycidyl-4-amino-m-cresol | 100 | | | | |
| ([F] epoxy resin having bisphenol backbone) | | | | | |
| AER4152 | | | | | |
| jER ® 4004P | | | | | |
| jER ® 1007 | | | | | |
| (Epoxy resin other than [A], [D], and [F]) | | | | | |
| EPOTOHTO ® YD-128 | | | | | 30 |
| EPICLON ® 830 | | 10 | | | |
| jER ® YX4000 | | | 96 | | |
| RE-602S | | | | | |
| EPICLON ® EXA1517 | | | | | 70 |
| SUMI-EPOXY ® ESCN-195XF | | | | 50 | |
| [B] at least one selected from the group consisting of thermoplastic resins that is compatible with the epoxy resin [A], and core-shell polymers | | | | | |
| SUMIKAXCEL ® PES5003P | 30 | | | | |
| Virantage ® VW-30500RP | | | | | |
| Vinylec ® K | | | | | |
| Kane Ace MX416 | | | | | |

TABLE 1-continued

|  |  |  |  |  |  |
|---|---|---|---|---|---|
| [C] amine curing agent |  |  |  |  |  |
| Seikacure S | 50 |  |  |  |  |
| 3,3'-DAS |  | 49 |  |  |  |
| Lonzacure M-MIPA |  |  |  |  |  |
| DICY7 |  |  |  |  |  |
| Curing agent other than amine curing agent [C] |  |  |  |  |  |
| methyltetrahydrophthalic anhydride |  |  |  |  | 85 |
| PHENOLITE ® TD-2131 |  |  | 46 | 48 |  |
| [E] thermoplastic resin particles insoluble in epoxy resin [A] |  |  |  |  |  |
| Grilamid ® TR-55 particles |  |  |  |  |  |
| Orgasol ® 1002D |  |  |  |  |  |
| Other components |  |  |  |  |  |
| DCMU99 |  |  |  |  |  |
| benzyl dimethyl amine |  |  |  |  | 0.8 |
| Characteristics of cured epoxy resin |  |  |  |  |  |
| flexural modulus (GPa) | 3.5 | 4.0 | 3.5 | 4.1 | 3.1 |
| nominal compressive strain at break (%) | 38 | 40 | 34 | 41 | 37 |

|  | Comparative Example 11 | Comparative Example 12 | Comparative Example 13 | Comparative Example 14 | Comparative Example 15 |
|---|---|---|---|---|---|
| Epoxy resin ([A] epoxy resin as represented by Formula (1)) |  |  |  |  |  |
| glycidyl compound of 2,2'-biphenol | 50 | 50 |  |  |  |
| glycidyl compound of 2,2'-dihydroxy-diphenyl methane |  |  |  |  |  |
| glycidyl compound of 2,2'-methylene-bis(4-methyl phenol) |  |  |  |  |  |
| glycidyl compound of 2,2'-isopropylidene diphenol |  |  | 50 |  |  |
| glycidyl compound of 2,2'-thiodiphenol |  |  |  |  |  |
| glycidyl compound of 2,2'-oxydiphenol |  |  |  |  |  |
| ([A] an epoxy resin as represented by Formula (2)) |  |  |  |  |  |
| glycidyl compound of 2-aminophenol |  |  |  | 25 |  |
| ([D] polyfunctional amine type epoxy resin) |  |  |  |  |  |
| SUMI-EPOXY ® ELM434 |  |  |  |  |  |
| Araldite ® MY721 | 50 | 50 | 50 | 35 | 35 |
| jER ® 630 |  |  |  |  | 25 |
| Araldite ® MY0600 |  |  |  |  |  |
| triglycidyl-4-amino-m-cresol |  |  |  |  |  |
| ([F] epoxy resin having bisphenol backbone) |  |  |  |  |  |
| AER4152 |  |  |  |  |  |
| jER ® 4004P |  |  |  |  |  |
| jER ® 1007 |  |  |  |  |  |
| (Epoxy resin other than [A], [D], and [F]) |  |  |  |  |  |
| EPOTOHTO ® YD-128 |  |  |  |  |  |
| EPICLON ® 830 |  |  |  | 40 | 40 |
| jER ® YX4000 |  |  |  |  |  |
| RE-602S |  |  |  |  |  |
| EPICLON ® EXA1517 |  |  |  |  |  |
| SUMI-EPOXY ® ESCN-195XF |  |  |  |  |  |
| [B] at least one selected from the group consisting of thermoplastic resins that is compatible with the epoxy resin [A], and core-shell polymers |  |  |  |  |  |
| SUMIKAXCEL ® PES5003P |  |  |  |  | 17 |
| Virantage ® VW-30500RP |  |  |  |  |  |
| Vinylec ® K |  |  |  |  |  |
| Kane Ace MX416 |  |  |  |  |  |
| [C] amine curing agent |  |  |  |  |  |
| Seikacure S | 47 |  | 47 | 47 | 47 |
| 3,3'-DAS |  |  |  |  |  |
| Lonzacure M-MIPA |  | 69 |  |  |  |
| DICY7 |  |  |  |  |  |

TABLE 1-continued

| Curing agent other than amine curing agent [C] | | | | | |
|---|---|---|---|---|---|
| methyltetrahydrophthalic anhydride | | | | | |
| PHENOLITE ® TD-2131 | | | | | |
| [E] thermoplastic resin particles insoluble in epoxy resin [A] | | | | | |
| Grilamid ® TR-55 particles | | | | | |
| Orgasol ® 1002D | | | | | |
| Other components | | | | | |
| DCMU99 | | | | | |
| benzyl dimethyl amine | | | | | |
| Characteristics of cured epoxy resin | | | | | |
| flexural modulus (GPa) | 4.2 | 4.1 | 4.2 | 4.1 | 3.8 |
| nominal compressive strain at break (%) | 43 | 44 | 45 | 40 | 50 |

| | Comparative Example 16 | Comparative Example 17 | Comparative Example 18 | Comparative Example 19 |
|---|---|---|---|---|
| Epoxy resin | | | | |
| ([A] epoxy resin as represented by Formula (1)) | | | | |
| glycidyl compound of 2,2'-biphenol | | | | 50 |
| glycidyl compound of 2,2'-dihydroxydiphenyl methane | | | | |
| glycidyl compound of 2,2'-methylene-bis(4-methyl phenol) | | | | |
| glycidyl compound of 2,2'-isopropylidene diphenol | | | | |
| glycidyl compound of 2,2'-thiodiphenol | | | | |
| glycidyl compound of 2,2'-oxydiphenol | | | | |
| ([A] an epoxy resin as represented by Formula (2)) | | | | |
| glycidyl compound of 2-aminophenol | | | | |
| ([D] polyfunctional amine type epoxy resin) | | | | |
| SUMI-EPOXY ® ELM434 | | | | |
| Araldite ® MY721 | | | | 50 |
| jER ® 630 | | | 20 | |
| Araldite ® MY0600 | | | | |
| triglycidyl-4-amino-m-cresol | | | | |
| ([F] epoxy resin having bisphenol backbone) | | | | |
| AER4152 | | | 30 | |
| jER ® 4004P | 20 | 30 | | |
| jER ® 1007 | | | 30 | |
| (Epoxy resin other than [A], [D], and [F]) | | | | |
| EPOTOHTO ® YD-128 | | | | |
| EPICLON ® 830 | 30 | 30 | 20 | |
| jER ® YX4000 | 50 | | | |
| RE-602S | | 40 | | |
| EPICLON ® EXA1517 | | | | |
| SUMI-EPOXY ® ESCN-195XF | | | | |
| [B] at least one selected from the group consisting of thermoplastic resins that is compatible with the epoxy resin [A], and core-shell polymers | | | | |
| SUMIKAXCEL ® PES5003P | | | | |
| Virantage ® VW-30500RP | | | | |
| Vinylec ® K | 7 | 7 | 5 | |
| Kane Ace MX416 | | | | |
| [C] amine curing agent | | | | |
| Seikacure S | | | | |
| 3,3'-DAS | | | | |
| Lonzacure M-MIPA | | | | |
| DICY7 | 5.1 | 5.5 | 5.1 | 9 |
| Curing agent other than amine curing agent [C] | | | | |
| methyltetrahydrophthalic anhydride | | | | |
| PHENOLITE ® TD-2131 | | | | |
| [E] thermoplastic resin particles insoluble in epoxy resin [A] | | | | |
| Grilamid ® TR-55 particles | | | | |
| Orgasol ® 1002D | | | | |
| Other components | | | | |
| DCMU99 | 3 | 3 | 3 | 3 |
| benzyl dimethyl amine | | | | |

TABLE 1-continued

| Characteristics of cured epoxy resin | | | | |
|---|---|---|---|---|
| flexural modulus (GPa) | 3.1 | 2.9 | 3.2 | 4.2 |
| nominal compressive strain at break (%) | 53 | 51 | 53 | 41 |

A comparison of Examples 1 to 29 with Comparative Examples 1 to 19 shows that our cured epoxy resin has a high elastic modulus and a high nominal compressive strain at break.

A comparison of Examples 1 and 2 with Comparative Examples 1 and 2 shows that even when component [B] which is at least one selected from the group consisting of thermoplastic resins that is compatible with the epoxy resin [A], and core-shell polymers, and an amine curing agent [C] are contained, the elastic modulus and nominal compressive strain at break of the resulting cured epoxy resin decrease if an epoxy resin as represented by Formula (1), which is referred to as epoxy resin [A], is not contained.

A comparison of Examples 12 to 15 with Comparative Examples 3 to 6 shows that even when component [B] which is at least one selected from the group consisting of thermoplastic resins that is compatible with the epoxy resin [A], and core-shell polymers, and an amine curing agent [C] are contained, the elastic modulus of the resulting cured epoxy resin decreases if an epoxy resin as represented by Formula (2), which is referred to as epoxy resin [A], is not contained.

A comparison of between Example 9 and Comparative Example 7, between Examples 16 and 17 and Comparative Example 11, between Examples 18 and 19 and Comparative Example 12, between Examples 20 and 21 and Comparative Example 13, and between Example 29 and Comparative Example 19 shows that even when an epoxy resin as represented by Formula (1), which is referred to as epoxy resin [A], and an amine curing agent [C] are contained, the nominal compressive strain at break of the resulting cured epoxy resin decreases if component [B], which is at least one selected from the group consisting of thermoplastic resins that is compatible with the epoxy resin [A], and core-shell polymers, is not contained.

A comparison of Examples 22 and 23 with Comparative Example 14 shows that even when an epoxy resin as represented by Formula (2), which is referred to as epoxy resin [A], and an amine curing agent [C] are contained, the nominal compressive strain at break of the resulting cured epoxy resin decreases if component [B], which is at least one selected from the group consisting of thermoplastic resins that is compatible with the epoxy resin [A], and core-shell polymers, is not contained.

A comparison of Example 1 with Comparative Examples 8 and 9 shows that even when an epoxy resin as represented by Formula (1), which is referred to as epoxy resin [A], is contained, the elastic modulus and the nominal compressive strain at break of the resulting cured epoxy resin decrease if component [B], which is at least one selected from the group consisting of thermoplastic resins that is compatible with the epoxy resin [A], and core-shell polymers, and an amine curing agent [C] are not contained.

A comparison of Examples 1 to 29 with Comparative Example 10 shows that the elastic modulus and the nominal compressive strain at break of the resulting cured epoxy resin are insufficiently low if an epoxy resin as represented by Formula (1) or an epoxy resin as represented by Formula (2), which is referred to as epoxy resin [A], component [B], which is at least one selected from the group consisting of thermoplastic resins that is compatible with the epoxy resin [A], and core-shell polymers, and an amine curing agent [C] are not contained.

A comparison of Examples 24 and 25 with Comparative Examples 16 to 18 shows that even when component [B], which is at least one selected from the group consisting of thermoplastic resins that is compatible with the epoxy resin [A], and core-shell polymers, and an amine curing agent [C] are contained, the elastic modulus of the resulting cured epoxy resin decreases if an epoxy resin as represented by Formula (1) or an epoxy resin as represented by Formula (2), which is referred to as epoxy resin [A], is not contained.

A comparison of Example 22 with Comparative Example 15 shows that even when component [B] which is at least one selected from the group consisting of thermoplastic resins that is compatible with the epoxy resin [A], and core-shell polymers, and an amine curing agent [C] are contained, the elastic modulus and nominal compressive strain at break decrease if an epoxy resin as represented by Formula (2), which is referred to as epoxy resin [A], is not contained,

INDUSTRIAL APPLICABILITY

We provide an epoxy resin composition high in both elastic modulus and nominal compressive strain at break. In addition, prepreg and fiber reinforced composite material produced from such an epoxy resin composition can serve effectively to produce structural materials. Preferred applications in the aerospace industry include, for instance, primary structural members of aircraft such as main wing, tail unit, and floor beam; secondary structural members such as flap, aileron, cowl, fairing, and other interior materials; and structural members of artificial satellites such as rocket motor case. Their preferred applications for general industrial uses include structural members of vehicles such as automobiles, ships, and railroad vehicles; and civil engineering and construction materials such as drive shafts, plate springs, windmill blades, various turbines, pressure vessels, flywheels, rollers for paper manufacture, roofing materials, cables, reinforcing bars, and mending/reinforcing materials. Preferred applications in the sporting goods industry include golf shafts, fishing poles, rackets for tennis, badminton, squash and the like, hockey sticks, and skiing poles.

The invention claimed is:

1. An epoxy resin composition comprising at least components (A), (B), (C) and (E):
   (A) a glycidyl compound of 2-aminophenol as an epoxy resin;
   (B) at least one component selected from the group consisting of a thermoplastic resin compatible with the epoxy resin (A), and core-shell polymers;
   (C) amine curing agent; and
   (E) thermoplastic resin particles that are insoluble in epoxy resin (A) and comprise polyamide and are spherical particles,
   wherein the component (A) and the thermoplastic resin compatible with the epoxy resin (A) are uniformly mixed and form a phase separated structure of less than 500 nm, and the component (A) accounts for 5 parts by mass or more and less than 30 parts by mass relative to the total epoxy resin quantity which accounts for 100 parts by mass.

2. The epoxy resin composition as set forth in claim 1, wherein the amine curing agent (C) is diaminodiphenyl sulfone, or a derivative or isomer thereof.

3. The epoxy resin composition as set forth in claim 1, wherein a polyfunctional amine epoxy (D) other than the epoxy resin (A) accounts for 20 to 70 parts by mass relative to the total epoxy resin quantity which accounts for 100 parts by mass.

4. The epoxy resin composition as set forth in claim 1, wherein the thermoplastic resin (B) that is compatible with the epoxy resin (A) has a glass transition temperature of 150° C. or more.

5. The epoxy resin composition as set forth in claim 1, further comprising thermoplastic resin particles (G) that are 1) insoluble in epoxy resin (A) and 2) at least one material selected from the group consisting of polyimide, polyamide-imide, polycarbonate, and polyphenylene sulfide.

6. The epoxy resin composition as set forth in claim 1, wherein the amine curing agent (C) is dicyandiamide or a derivative thereof.

7. The epoxy resin composition as set forth in claim 1, further comprising an epoxy resin (F) having a bisphenol backbone and having an epoxy equivalent of 300 to 5,000.

8. A cured epoxy resin material produced by curing the epoxy resin composition as set forth in claim 1.

9. A fiber reinforced composite material comprising the cured epoxy resin material as set forth in claim 8 and reinforcement fiber.

10. A prepreg produced by impregnation of reinforcement fiber with the epoxy resin composition as set forth in claim 1.

11. A fiber reinforced composite material produced by curing the prepreg as set forth in claim 10.

12. The epoxy resin composition as set forth in claim 1, wherein the component (A) accounts for 10 parts by mass or more and less than 25 parts by mass relative to the total epoxy resin quantity which accounts for 100 parts by mass.

13. The epoxy resin composition as set forth in claim 1, wherein an average particle diameter of (E) thermoplastic resin particles is 13 μm or 21 μm.

* * * * *